(12) United States Patent
 Kuno

(10) Patent No.: US 11,212,407 B2
(45) Date of Patent: Dec. 28, 2021

(54) CONTROL METHOD FOR AN APPARATUS FOR CONTROLLING A READING APPARATUS AND STORAGE MEDIUM

(71) Applicant: CANON KABUSHIKI KAISHA, Tokyo (JP)

(72) Inventor: Koichi Kuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/089,557

(22) Filed: Nov. 4, 2020

(65) Prior Publication Data
US 2021/0168255 A1  Jun. 3, 2021

(30) Foreign Application Priority Data

Nov. 29, 2019 (JP) .............................. JP2019-216998

(51) Int. Cl.
 *H04N 1/00* (2006.01)
 *H04N 1/12* (2006.01)
(52) U.S. Cl.
 CPC ..... *H04N 1/00822* (2013.01); *H04N 1/00005* (2013.01); *H04N 1/0044* (2013.01); *H04N 1/121* (2013.01)
(58) Field of Classification Search
 None
 See application file for complete search history.

(56) References Cited

U.S. PATENT DOCUMENTS

| 6,421,110 | B1 * | 7/2002 | Yakawa ................. G03B 27/32 355/40 |
| 10,334,137 | B2 | 6/2019 | Noro et al. .......... H04N 1/3878 |
| 2005/0117178 | A1 * | 6/2005 | Atobe ................ H04N 1/00217 358/1.15 |
| 2016/0012621 | A1 * | 1/2016 | Kanada .............. G06Q 10/1091 345/440 |

FOREIGN PATENT DOCUMENTS

JP  2005-148928  6/2005

OTHER PUBLICATIONS

U.S. Appl. No. 17/089,521, filed Nov. 4, 2020.

* cited by examiner

*Primary Examiner* — Frantz Bataille
(74) *Attorney, Agent, or Firm* — Venable LLP

(57) ABSTRACT

A control method for an apparatus for controlling a reading apparatus that performs reading in a transmission mode includes a read controlling step, a generating step and a processing step. In a read controlling step, the reading apparatus is controlled to read at least one film in the transmission mode based on a reading instruction from operating system standard software. In a generating step, a display image is generated, in which at least one frame image is arranged, based on a read image obtained by the reading in the read controlling step. In a processing step, a processing for displaying the display image generated in the generating step by using the operating system standard software, is executed.

20 Claims, 27 Drawing Sheets

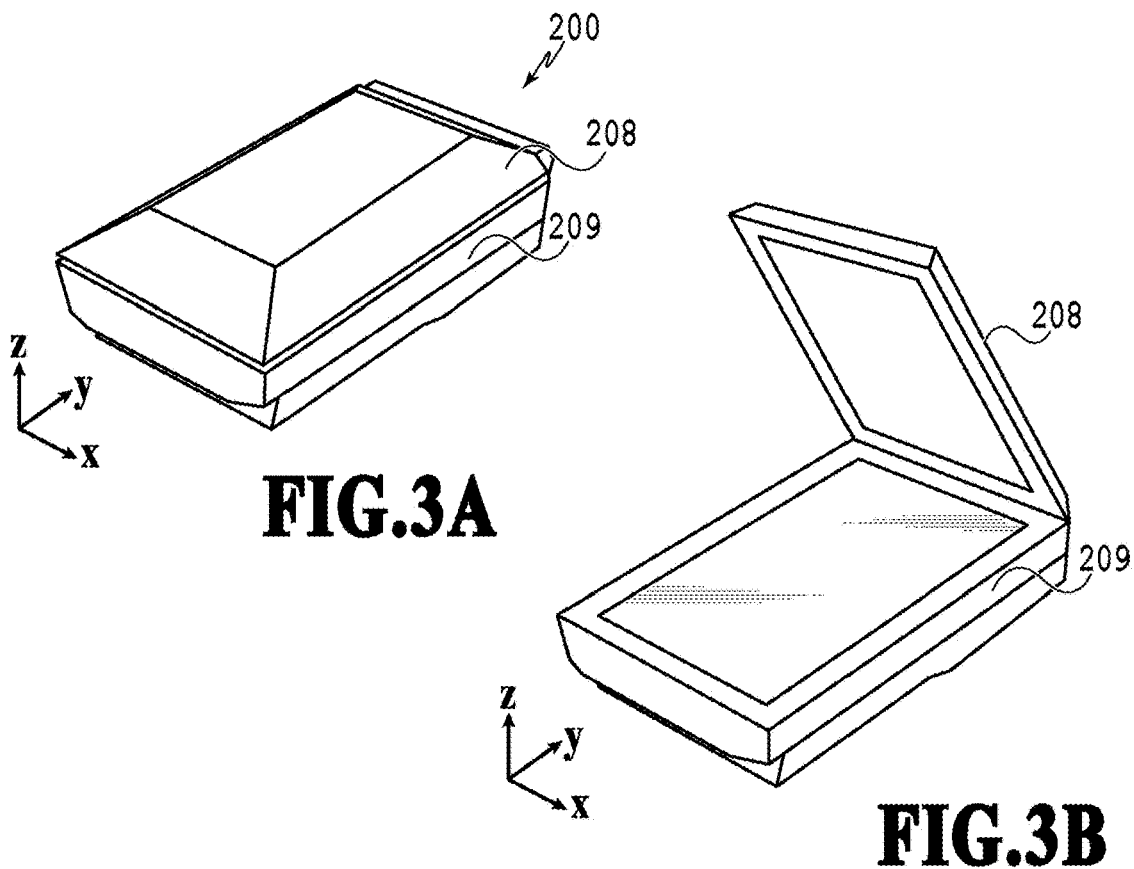
FIG.3A
FIG.3B
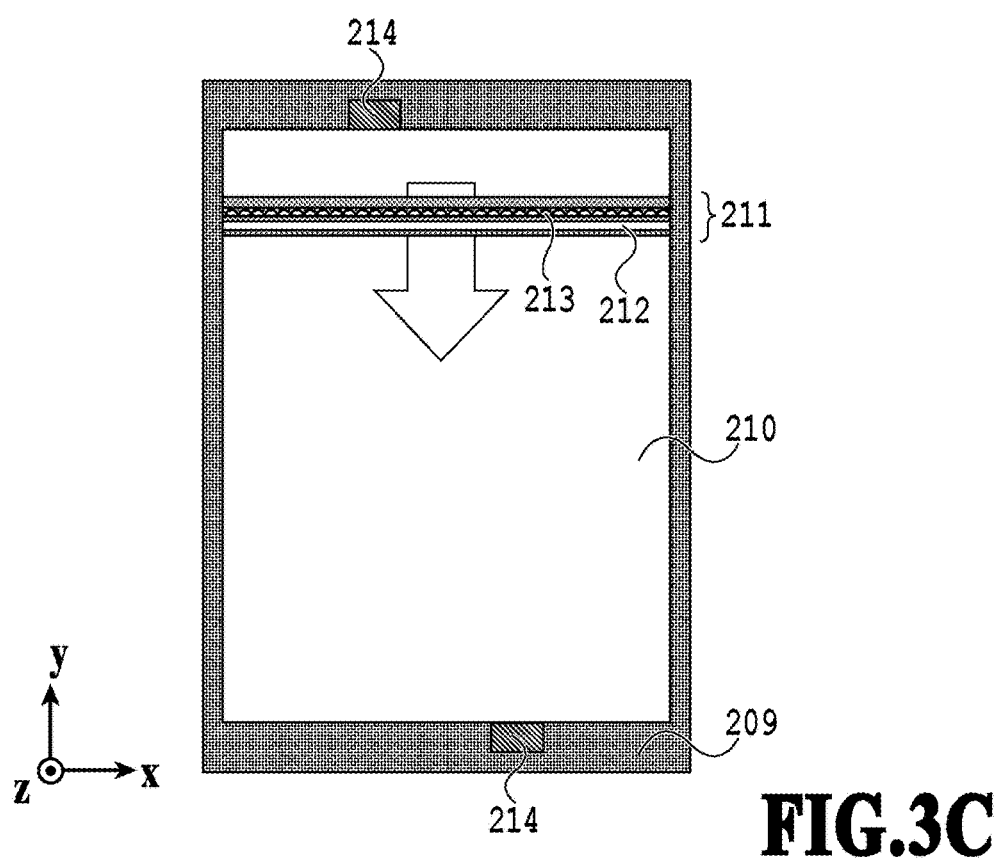
FIG.3C

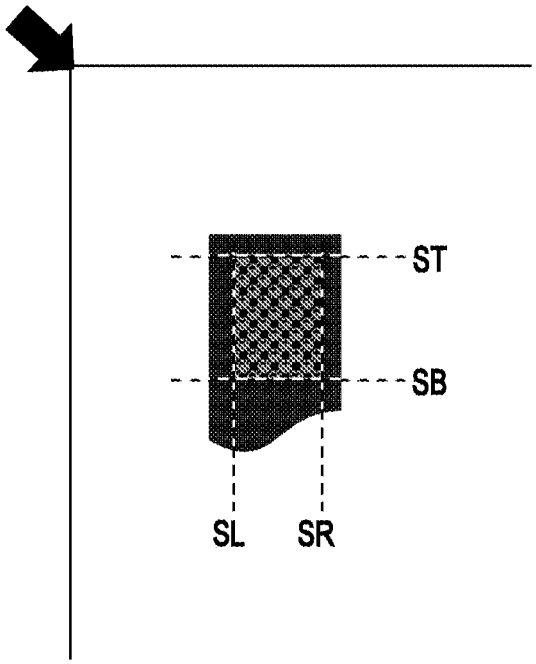
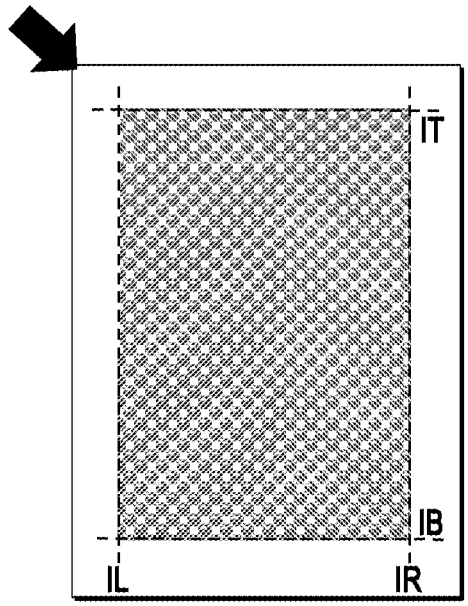
FIG.13A
FIG.13B
| | | Left | Right | Top | Bottom |
|---|---|---|---|---|---|
| 1 | SCAN COORDINATES | $SL_1$ | $SR_1$ | $ST_1$ | $SB_1$ |
| | IMAGE COORDINATES | $IL_1$ | $IR_1$ | $IT_1$ | $IB_1$ |
| ... | ... | ... | ... | ... | ... |
| n | SCAN COORDINATES | $SL_n$ | $SR_n$ | $ST_n$ | $SB_n$ |
| | IMAGE COORDINATES | $IL_n$ | $IR_n$ | $IT_n$ | $IB_n$ |
FIG.13C

|  | X - COORDINATE | | Y - COORDINATE | |
|---|---|---|---|---|
|  | Left | Right or Width | Top | Bottom or Height |
| COORDINATES CROPPED BY USER ON PREVIEW DISPLAY | UL | UR | UT | UB |
| SCAN COORDINATES CORRESPONDING TO FRAME n OF SCANNER | SL | SR | ST | SB |
| IMAGE COORDINATES ARRANGING FRAME n ON PREVIEW DISPLAY | IL | IR | IT | IB |
| SCALE OF SCAN COORDINATES AND CROP COORDINATES | $\Delta X = \|SR-SL\| / \|IR-IL\|$ | | $\Delta Y = \|SB-ST\| / \|IB-IT\|$ | |
| DIFFERENTIAL BETWEEN IMAGE COORDINATES OF FRAME n AND CROP COORDINATES | $UL' = \|UL-IL\|$ | | $UT' = \|IT-UT\|$ | |
| CONVERT CROP COORDINATES INTO OFFSET OF SCAN COORDINATES | $UL'' = SL + (UL' * \Delta X)$ | | $UT'' = ST + (UT' * \Delta Y)$ | |
| SIZE OF REGION CROPPED BY USER |  | $W = \|UR-UL\|$ |  | $H = \|UB-UT\|$ |
| CONVERT SIZE OF IMAGE COORDINATES INTO SCAN COORDINATES |  | $W' = W * \Delta X$ |  | $H' = H * \Delta Y$ |
| DETERMINE SCANNING REGION | $UL''$ | $UL'' + W' - 1$ | $UT''$ | $UT'' + H' - 1$ |

FIG.17

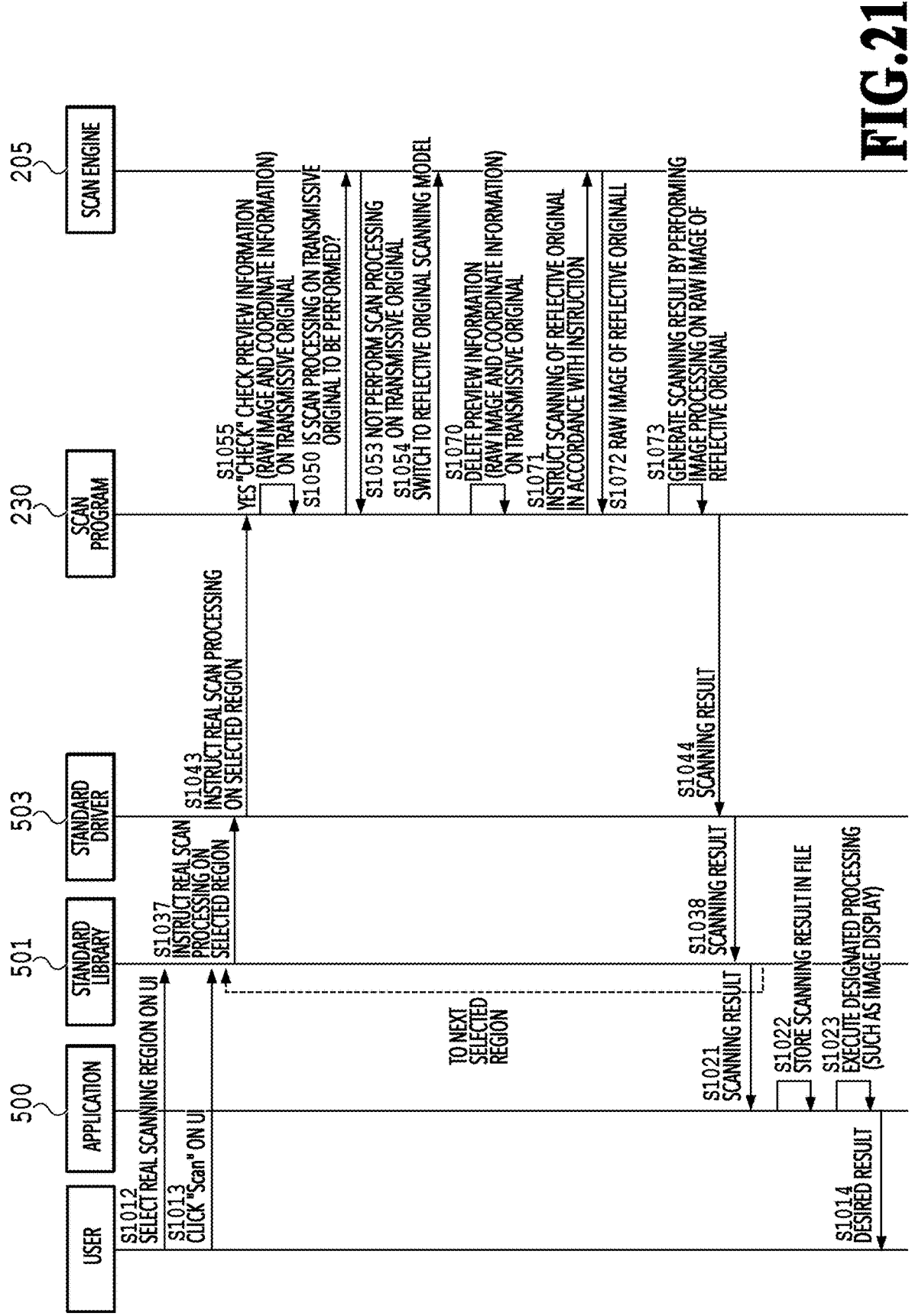

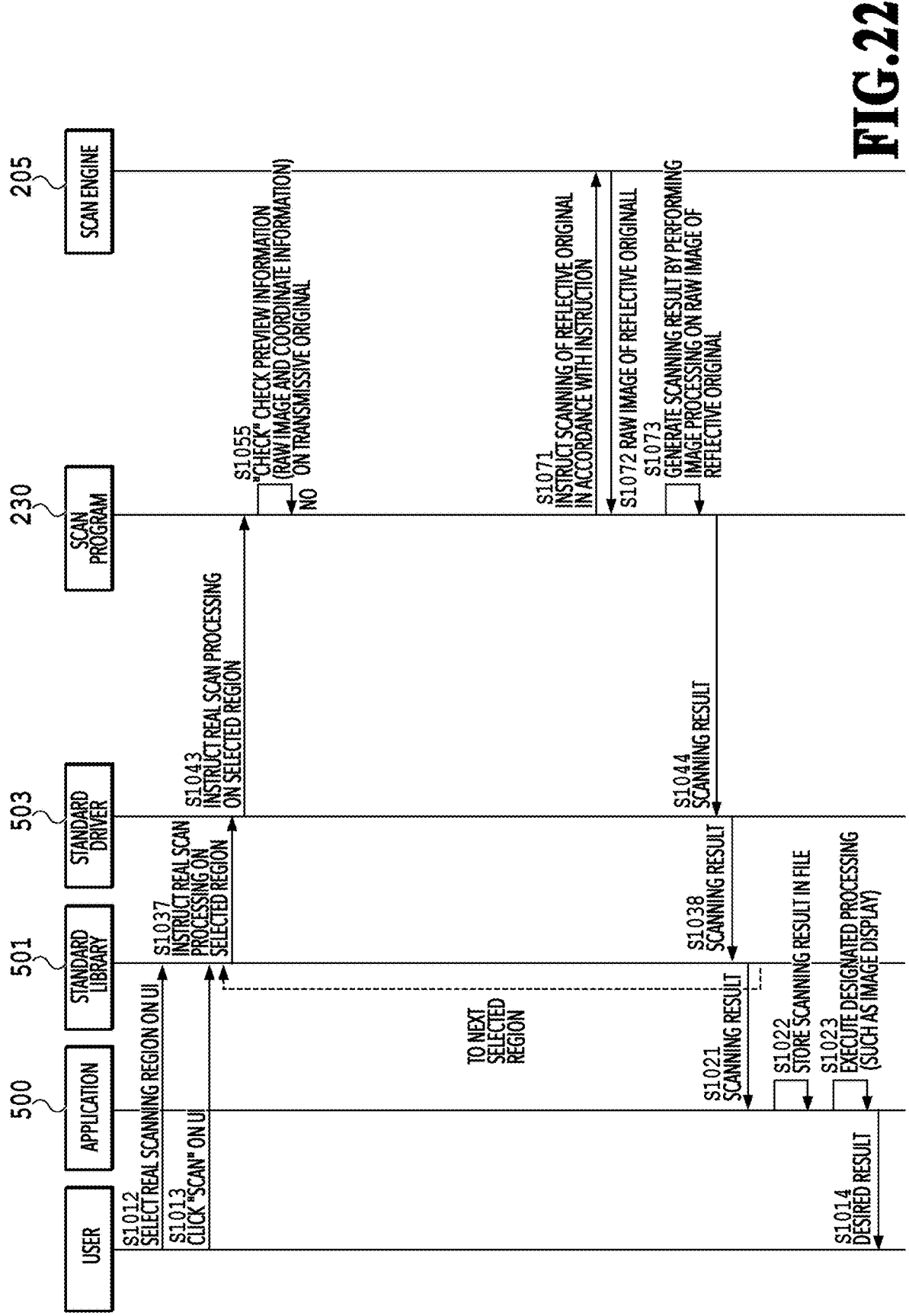

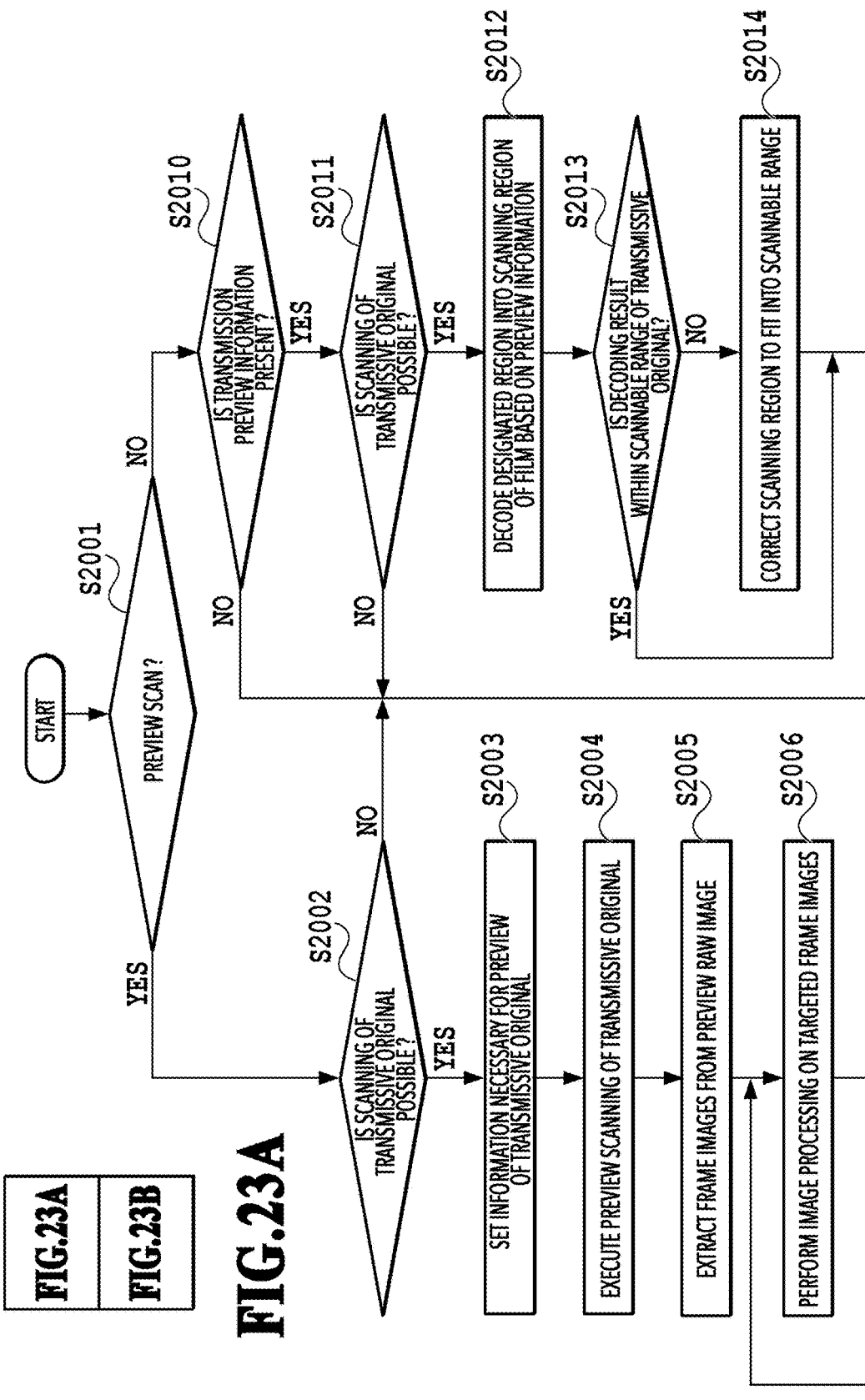

CONTROL METHOD FOR AN APPARATUS FOR CONTROLLING A READING APPARATUS AND STORAGE MEDIUM

BACKGROUND OF THE INVENTION

Field of the Invention

The present invention relates to a control method for an apparatus for controlling a reading apparatus and a storage medium.

Description of the Related Art

Among scanners (image processing apparatuses) capable of performing image reading processing, there are scanners that can achieve various reading modes. For instance, there is a scanner that can selectively switch between a flatbed mode to move a reading sensor relative to an original placed on a platen and an automatic document feeder (ADF) mode to move the original relative to the reading sensor. There is also a scanner designed to read an image in a reflection mode and to read an image in a transmission mode.

Each of these image processing apparatuses is generally controlled under the instructions from an information processing apparatus such as a personal computer. To be more precise, an operating system (OS) installed on the information processing apparatus reads a device driver in response to a request from an application, and controls the image processing apparatus through the device driver thus read out.

Japanese Patent Laid-Open No. 2005-148928 discloses a method of preparing an extended interface for exchanging setting information unique to a device driver, recognizing the setting information unique to the device driver by using management information obtained through the extended interface, and notifying an application of the setting information.

In general, device drivers (hereinafter simply referred to as drivers) include a vendor driver provided by a vendor of an image processing apparatus, and a standard driver provided by an OS manufacturer. The vendor driver is capable of utilizing various functions provided uniquely to the image processing apparatus, such as displaying a user interface unique to the vendor, presenting various extended functions to a user through the user interface, and accepting execution commands of the functions from the user.

Meanwhile, the standard driver is a general-purpose driver equipped with basic functions. The standard driver is less likely to cause security problems as compared to the vendor driver and is more adaptable to OS upgrading. The standard driver also has an advantage of compatibility with various image processing apparatuses.

However, the use of the standard driver may lead to a failure to utilize the extended functions provided uniquely to each image processing apparatus. For example, the image processing apparatus equipped with a reflection scanning function to read an image in a reflection mode and a transmission scanning function to read an image in a transmission mode may fail to execute the transmission scanning if the information processing apparatus uses the standard driver. In other words, even if an original suitable for transmission scanning such as a negative film is set on the image processing apparatus, the image processing apparatus may be capable of reading this transmissive original in the reflection scanning mode only.

SUMMARY OF THE INVENTION

The present invention has been made to solve the above-mentioned problem. An object of the present invention is to provide an image processing apparatus that is capable of appropriately reading a transmissive original even in a case where the image processing apparatus is controlled by a standard driver that does not support the scan processing on the transmissive original.

In a first aspect of the present invention, there is provided a control method for a reading apparatus configured to perform reading in a transmission mode for reading a film by using transmission light transmitted through the film, comprising: a read controlling step of causing the reading apparatus to read at least one film in the transmission mode based on a reading instruction from operating system standard software, wherein the at least one film includes a plurality of frames; a generating step of generating a display image based on a read image obtained by the reading in the read controlling step, wherein at least one frame image corresponding to at least one of the plurality of frames is arranged in the display image; and a processing step of executing processing for displaying the display image generated in the generating step by using the operating system standard software.

In a second aspect of the present invention, there is provided a non-transitory computer readable storage medium storing a program for causing a computer to execute a control method for a reading apparatus configured to perform reading in a transmission mode for reading a film by using transmission light transmitted through the film, the control method comprising: a read controlling step of causing the reading apparatus to read at least one film in the transmission mode based on a reading instruction from operating system standard software, wherein the at least one film includes a plurality of frames; a generating step of generating a display image based on a read image obtained by the reading in the read controlling step, wherein at least one frame image corresponding to at least one of the plurality of frames is arranged in the display image; and a processing step of executing processing for displaying the display image generated in the generating step by using the operating system standard software.

Further features of the present invention will become apparent from the following description of exemplary embodiment with reference to the attached drawings.

BRIEF DESCRIPTION OF THE DRAWINGS

FIGS. 3A to 3C are schematic configuration diagrams of an image processing apparatus;

FIGS. 13A to 13C are diagrams for explaining coordinate information;

FIG. 17 is a diagram for explaining a method of calculating a real scanning region;

FIG. 21 is a diagram showing processing procedures in the case of performing the real scan processing;

FIG. 22 is a diagram showing the processing procedures in the case of performing the real scan processing;

FIG. 23 is a diagram showing the relationship of FIGS. 23A and 23B;

FIG. 23A is a flowchart showing processing to be executed by a CPU of the image processing apparatus;

DESCRIPTION OF THE EMBODIMENTS

Embodiments of the present invention will be described below in detail with reference to the accompanying drawings. Note that the following description of the embodiments is not intended to limit the scope of the present invention as defined in the appended claims. In addition, it is to be also understood that a solution of the present invention does not always require a combination of all of the features described in the embodiments.

First Embodiment

Figure 1:
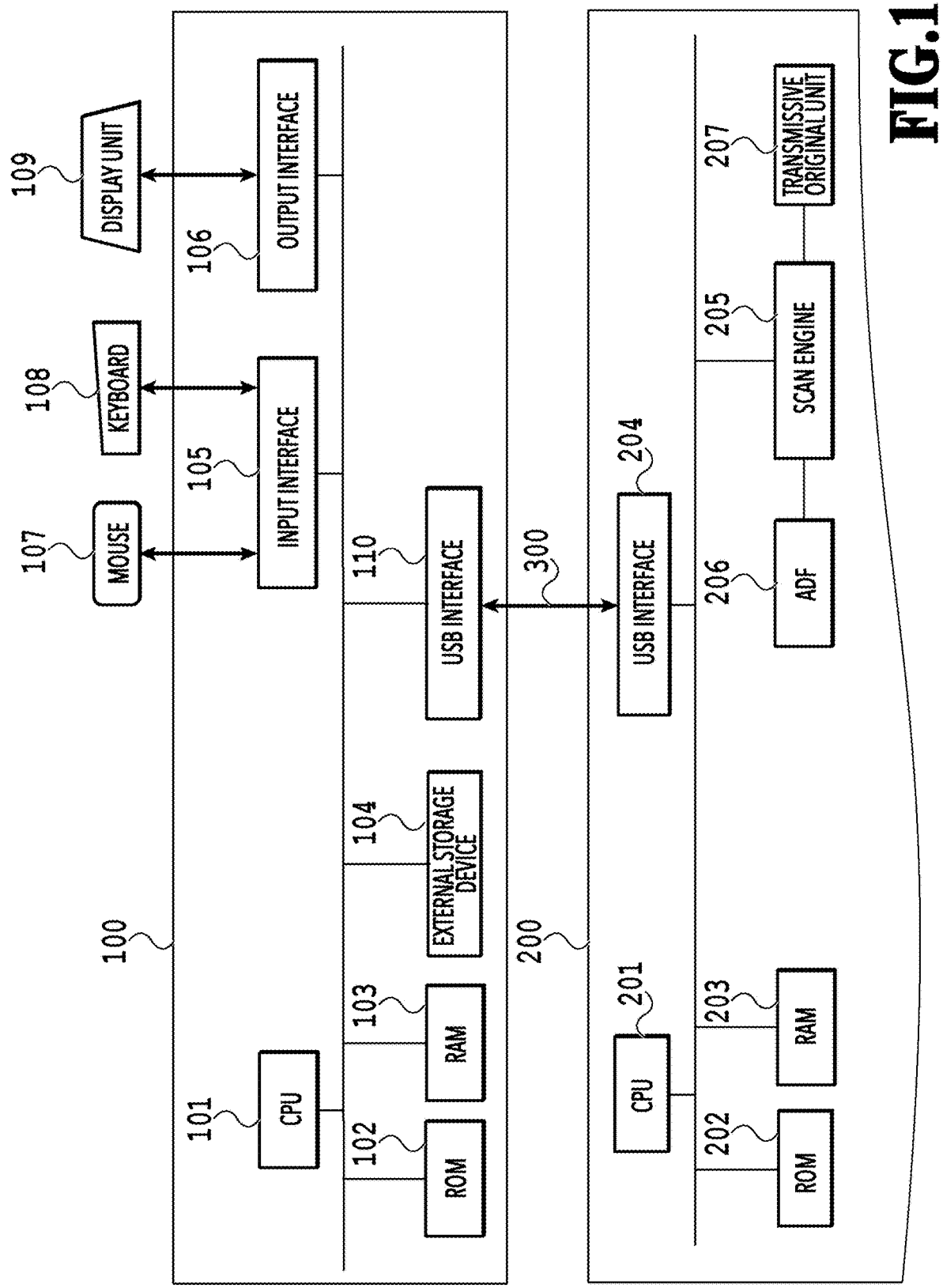
FIG. 1 is a diagram showing an image processing system used in a first embodiment.

FIG. 1 is a diagram showing an image processing system used in this embodiment. The image processing system of this embodiment includes an information processing apparatus 100 and an image processing apparatus 200.

In the information processing apparatus 100, a CPU 101 controls the entire apparatus in accordance with various programs stored in a ROM 102 or in an external storage device 104 while using a RAM 103 as a work area. The ROM 102 stores an initialization program. The external storage device 104 stores software including an operating system (OS), an application, a standard library, a standard driver, and a vendor driver as well as various data.

An input interface 105 provides the CPU 101 with an instruction inputted through a mouse 107 and a keyboard 108. An output interface 106 displays prescribed information on a display unit 109 in accordance with an instruction from the CPU 101. A user can input various settings and commands by using the mouse 107 and the keyboard 108 while checking the information displayed on the display unit 109. A USB interface 110 exchanges information with a USB interface 204 of the image processing apparatus 200 through a USB cable 300. Here, the information processing apparatus 100 and the image processing apparatus 200 may be connected through a network using LAN interfaces or the like instead of the interfaces 110 and 204.

In the image processing apparatus 200, a CPU 201 controls the entire apparatus in accordance with programs stored in a ROM 202 while using a RAM 203 as a work area. A scan engine 205 includes an optical sensor to be described later, a motor to drive the optical sensor, and the like, and performs a variety of scan processing under the control of the CPU 201 and based on contents of jobs stored in the RAM 203. In this instance, the scan engine 205 operates an ADF 206 and a transmissive original unit 207 as needed. Image data obtained in a reading operation performed by the scan engine 205 is loaded on the RAM 203 and a variety of processing to be described later is implemented by the CPU 201.

Figure 2:
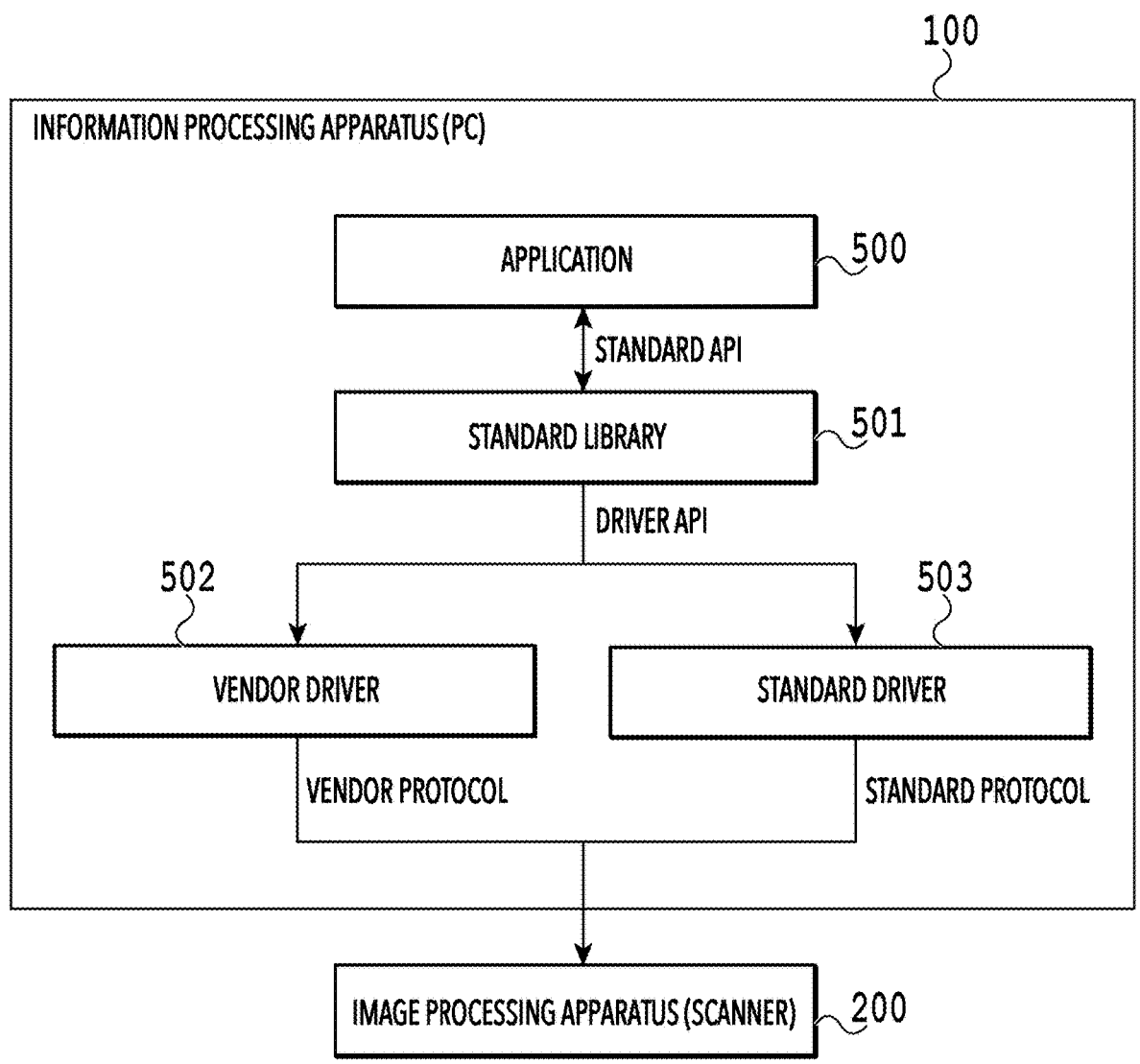
FIG. 2 is a schematic diagram showing a software configuration of an information processing apparatus.

FIG. 2 is a schematic diagram showing a software configuration of the information processing apparatus 100. In a case where the user intends to perform processing to scan an original by using the image processing apparatus 200, the user starts an application 500 on the information processing apparatus 100. The application 500 is a scanning application that causes the image processing apparatus 200 to perform scan processing through any of a standard library 501, a vendor driver 502, and a standard driver 503, and stores an image obtained by the image processing apparatus 200.

Meanwhile, the application 500 invokes a program in the standard library 501 included in the OS by using an application program interface defined in standard terms of the application (hereinafter referred to as a standard API).

Based on a command of the application 500, the standard library 501 accumulates a content of control in its own variable or issues a command to the vendor driver 502 or the standard driver 503 by using a driver API. The vendor driver 502 is a driver provided by a vendor of the image processing apparatus 200. The standard driver 503 is a driver provided by an OS manufacturer and included in the OS. The vendor driver 502 controls the image processing apparatus 200 by using a vendor protocol defined uniquely by the vendor. The standard driver 503 controls the image processing apparatus 200 by using a standard protocol defined by the OS manufacturer or a standardization organization.

Upon receipt of a driver start instruction from the application 500, the standard library 501 switches between an action to start the vendor driver 502 and an action to start the standard driver 503 as appropriate. As for a condition for this switching, the driver to be started may be switched depending on the type of the application 500, for example. To be more precise, the vendor that offers the vendor driver 502 provides a scanning application for the vendor driver 502 and a scanning application for the standard driver 503 as the applications 500. Moreover, in the case of installing these scanning applications, information for specifying the drivers corresponding to the scanning applications is stored in an area that can be referred to by the standard library 501. Then, upon receipt of the driver start instruction from the application 500, the standard library 501 starts the driver specified in the information. Here, a single application 500 may designate the vendor driver 502 or the standard driver 503 and the standard library 501 may start the designated driver.

The vendor driver 502 that uses the vendor protocol can send a detailed instruction to the image processing apparatus 200 so that the image processing apparatus 200 can fully utilize functions provided thereto. Meanwhile, the standard driver 503 that uses the standard protocol sends a standard instruction which is common to various image processing apparatuses.

Specifically, in a case of utilizing the image processing apparatus 200 in a standard mode, there is no difference between the vendor driver 502 and the standard driver 503. However, in a case where the image processing apparatus 200 has a unique extended function, the standard driver 503 may not be able to utilize the extended function.

In this embodiment, the image processing apparatus 200 is assumed to be capable of implementing scan processing in a standard reflection mode (hereinafter referred to reflection scanning) and scan processing in a transmission mode (hereinafter referred to as transmission scanning). Details of the reflection scanning and the transmission scanning will be described later with reference to FIGS. 3A to 5C. Then, the vendor driver 502 that can use the vendor protocol supports the reflection scanning and the transmission scanning for the image processing apparatus 200, and can unambiguously instruct the image processing apparatus 200 which scan processing to perform. On the other hand, the standard driver 503 that uses the standard protocol is assumed to support the reflection scanning but not to support the transmission scanning. Specifically, though the standard driver 503 can send a command concerning the reflection scanning, the standard driver 503 cannot send a command concerning the transmission scanning. Even if the application 500 attempts to invoke the function extended by using the vendor driver 502 through the standard driver 503, the standard driver 503 which does not understand the vendor protocol will ignore this invocation or determine the invocation as an error.

FIGS. 3A to 3C are schematic configuration diagrams of the image processing apparatus 200 of this embodiment. The image processing apparatus 200 of this embodiment is a scanner which can implement the reflection scanning to irradiate an original with light and to read the light reflected from the original with an optical sensor, and the transmission scanning to irradiate an original with light and to read the light transmitted through the original with an optical sensor.

The image processing apparatus 200 mainly includes a platen 209 and a platen cover 208. FIG. 3A is an external perspective view showing a state where the platen cover 208 is closed while FIG. 3B is an external perspective view showing a state where the platen cover 208 in open. In the case of causing the image processing apparatus 200 to perform the scan processing, the user opens the platen cover 208 and then closes the platen cover 208 in a state where an original is placed on the platen 209.

FIG. 3C is a diagram of the platen 209 viewed from above. A flat and smooth platen glass 210 is fitted into a surface of the platen 209. A scanner bar 211 extending in an X direction is provided below (on a −Z direction side of) the platen glass 210. The scanner bar 211 is equipped with a reflection light source 212 extending in the X direction and optical sensors 213 arranged in the X direction.

Figure 4B:
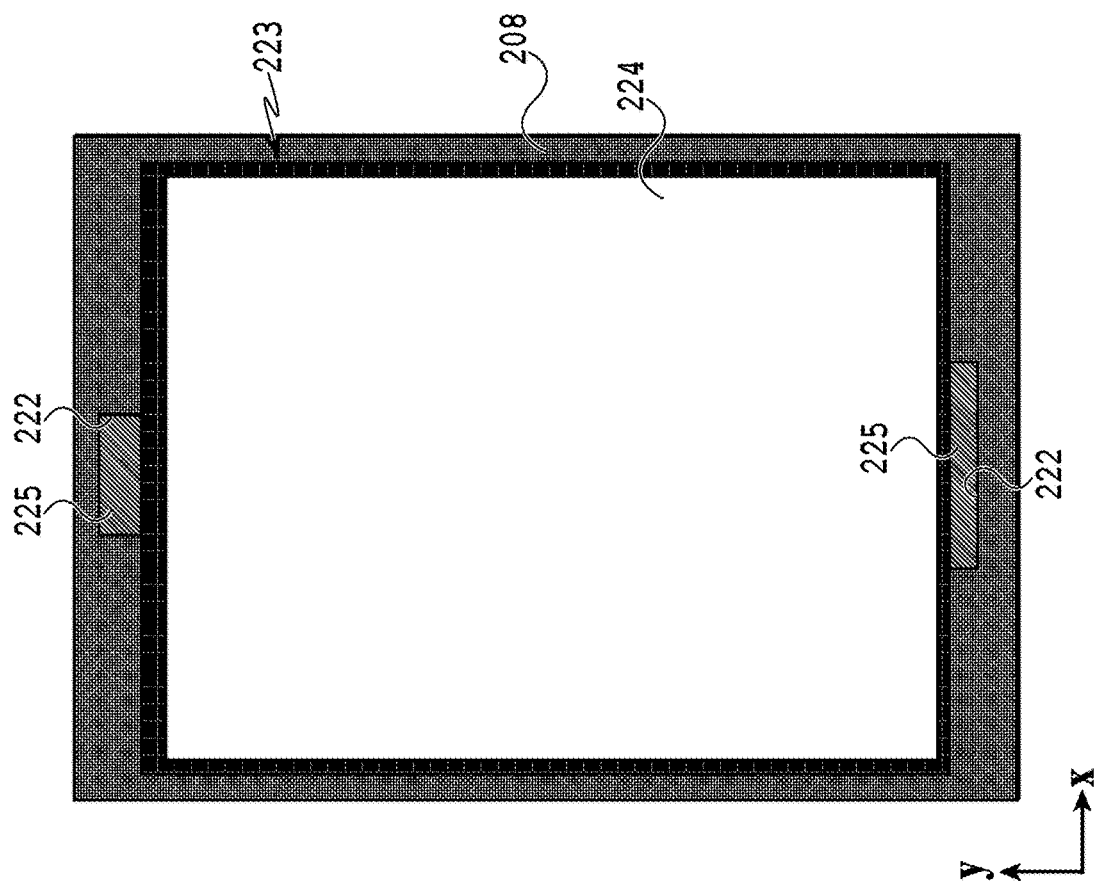
FIGS. 4A and 4B are diagrams showing appearances of a platen protection sheet being attached to a platen cover.
Figure 4A:
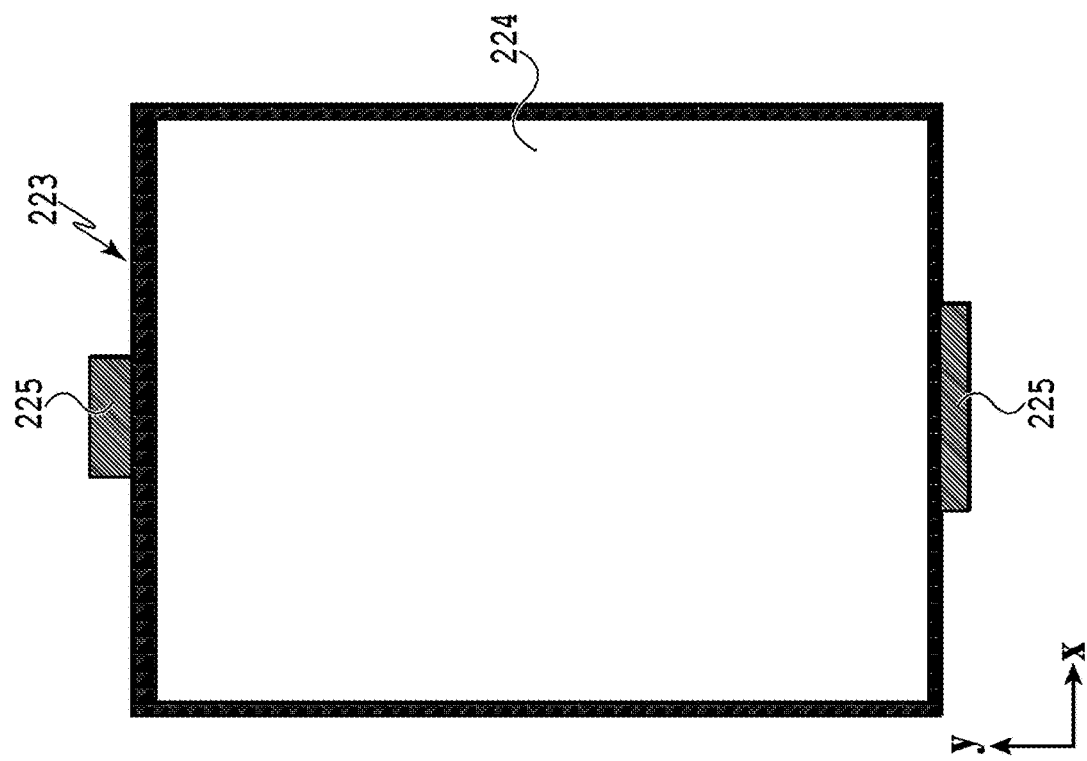

FIGS. 4A and 4B are diagrams showing appearances of a platen protection sheet 223 being attached to the platen cover 208. The platen protection sheet 223 is attached to the platen cover 208 in the case where the image processing apparatus 200 performs the reflection scanning. As shown in FIG. 4A, the platen protection sheet 223 includes a white sheet 224 that covers the entire surface of the platen glass 210. The white sheet 224 reflects light emitted from the reflection light source 212 at high reflectivity to stabilize reading of the original. Protection sheet hooks 225 are provided at two ends of the platen protection sheet 223 so as to function as positioning members in the case of attaching the platen protection sheet 223 to the platen cover 208.

FIG. 4B shows a lower surface of the platen cover 208, or in other words, a surface to come into contact with the platen 209. The platen protection sheet 223 is attached to this surface in the state shown in FIG. 4B. The platen protection sheet 223 can be attached to the platen cover 208 by engaging the protection sheet hooks 225 with protection sheet notches 222 of the platen cover 208.

In the case of performing reflective original scanning in a flatbed mode, the user closes the platen cover 208 attaching the platen protection sheet 223 in a state of placing the original on the platen 209 in such a way as to bring a surface of the original to be read into contact with the platen glass 210, and then starts desired scan processing. Thus, the scanner bar 211 with the reflection light source 212 being turned on moves in a Y direction at a prescribed speed and the optical sensors 213 detect the light reflected from the original in the process of the movement. As a consequence, an image on the original pressed against the platen glass 210 is obtained.

Here, guide notches 214 for positioning a film guide used in the transmission scanning are disposed on ±Y sides of the platen glass 210 of the platen 209 (see FIG. 3C).

Figure 5A:
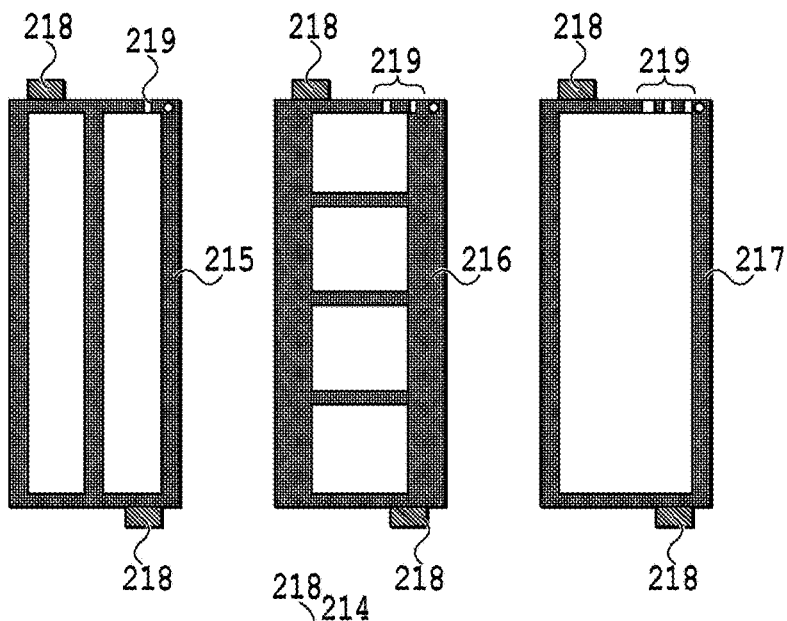
FIGS. 5A to 5C are diagrams for explaining a setting configuration of an original in a case of performing transmission scanning.
Figure 5B:
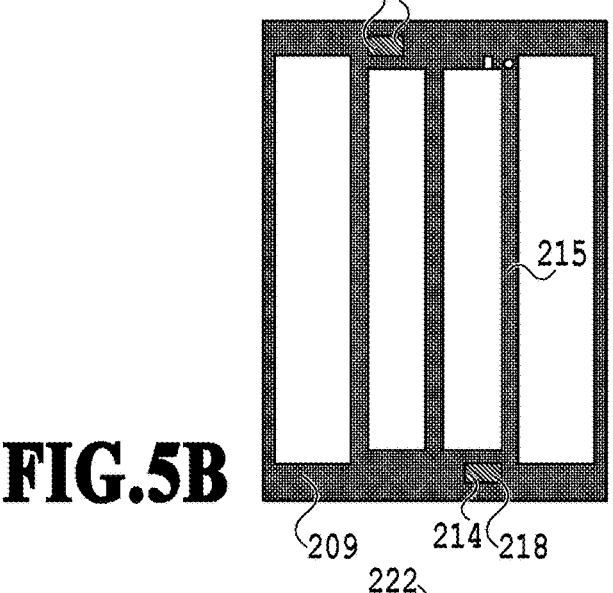
Figure 5C:
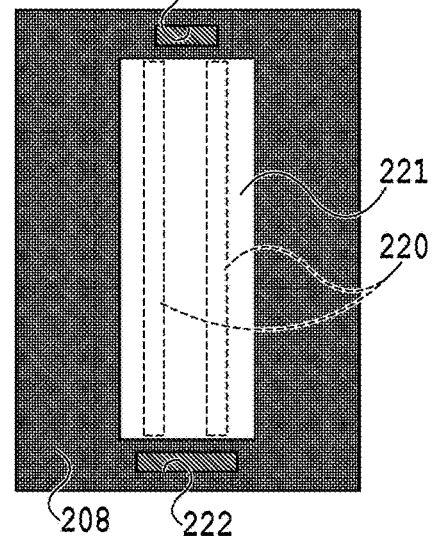

FIGS. 5A to 5C are diagrams for explaining a setting configuration of the original in the case of performing the transmission scanning. The image processing apparatus 200 of this embodiment can use a negative film or a positive film as the original in the transmission scanning. FIG. 5A shows film guides used in the case of performing the transmission scanning. In this embodiment, a sleeve film guide 215, a slide film guide 216, and a brownie film guide 217 are prepared so that each film guide in a state of loading the corresponding film can be set on the platen 209. Guide hooks 218 are provided on upper and lower end portions of each of the film guides 215 to 217, which serve as positioning members in the case where each film guide is set on the platen 209. Moreover, detection patterns 219 to identify types of the film guides, or in other words, types of the films are formed at the upper ends of the respective film guides 215 to 217.

FIG. 5B shows a state of setting the sleeve film guide 215 on the platen 209 by engaging the guide hooks 218 with the guide notches 214 of the platen 209.

FIG. 5C shows the platen cover 208 in the state where the platen protection sheet 223 is detached therefrom. A transmission light source 220 and a transmission light source plate 221 extend in the Y direction at the center of the platen cover 208.

In the case of performing the transmission scanning, the user sets the film as the original on one of the film guides 215 to 217 and sets the one of the film guides 215 to 217 on the platen 209. Then, the user closes the platen cover 208 and starts the prescribed scan processing. In this way, the emitted light from the transmission light source 220 is diffused by the transmission light source plate 221, and the entire film surface is uniformly irradiated with the light from above. Meanwhile, the reflection light source 212 loaded on the scanner bar 211 is off. In this state, the scanner bar 211 moves in the Y direction at a predetermined speed. In this moving process, the optical sensors 213 can read the image on the original by detecting the light transmitted through the film.

Here, the transmission light source 220 may be formed from two or more light sources. Meanwhile, the transmission light source 220 and the transmission light source plate 221 may be moved in the Y direction together with the scanner bar 211 so as to be able to scan a film in a larger size. Moreover, the transmission light source 220 and the transmission light source plate 221 may be formed into a compact integrated cartridge so that this cartridge can be manually placed at various locations on the platen cover 208.

In the meantime, although it is not illustrated in FIG. 3, the image processing apparatus 200 of this embodiment also includes the automatic document feeder (ADF) 206. In the case of performing the reflection scanning by using the ADF 206, the user sets the originals on the ADF 206 and then starts the prescribed scan processing. Thus, the originals loaded on the ADF 206 are fed one by one into the apparatus and conveyed at a constant speed so as to face the optical sensors 213 of the positioned scanner bar 211. In the process of conveyance, the optical sensors 213 detect the light emitted from the reflection light source 212 and reflected from the originals, thereby reading the images on the originals.

Here, optical sensors for performing the reflection scanning using the ADF may be provided to the image processing apparatus 200 in addition to the optical sensors 213 for the flatbed. Meanwhile, optical sensors may be arranged on a top surface side and a bottom surface side of a conveyance path of the ADF so as to read the top and bottom surfaces of each original in the same conveyance operation.

Figure 6A:
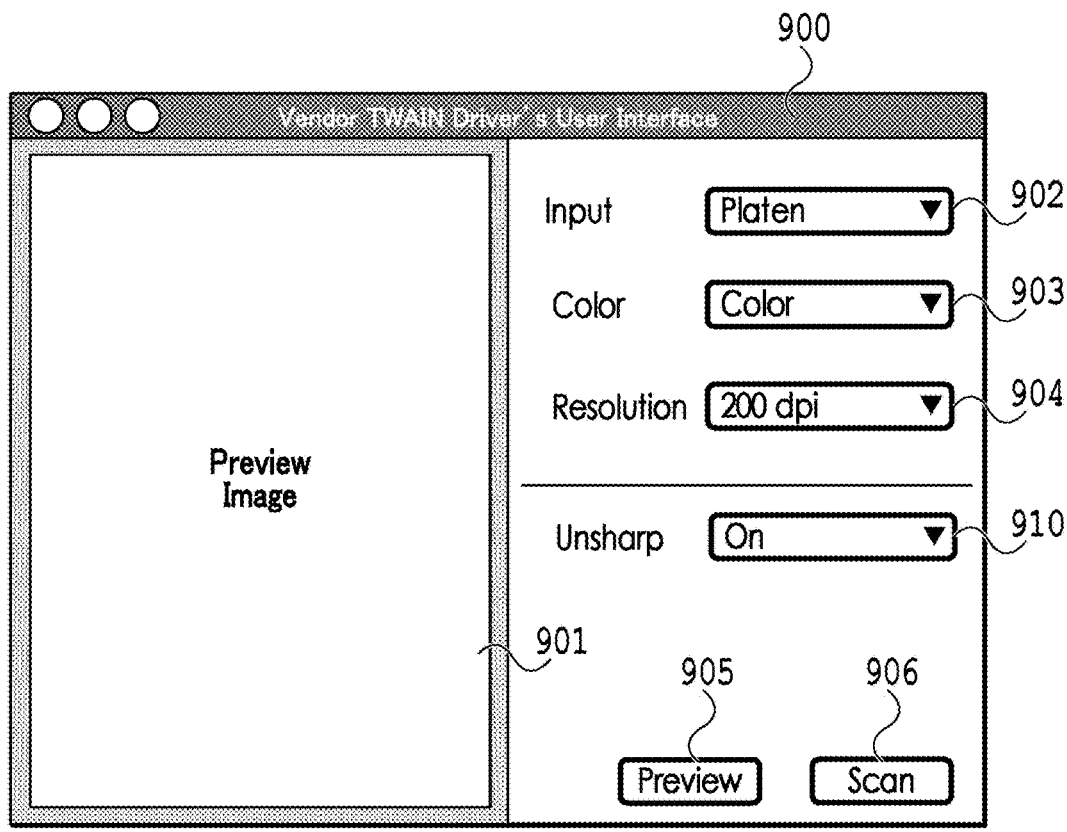
FIGS. 6A and 6B are diagrams each showing a UI screen.
Figure 6B:
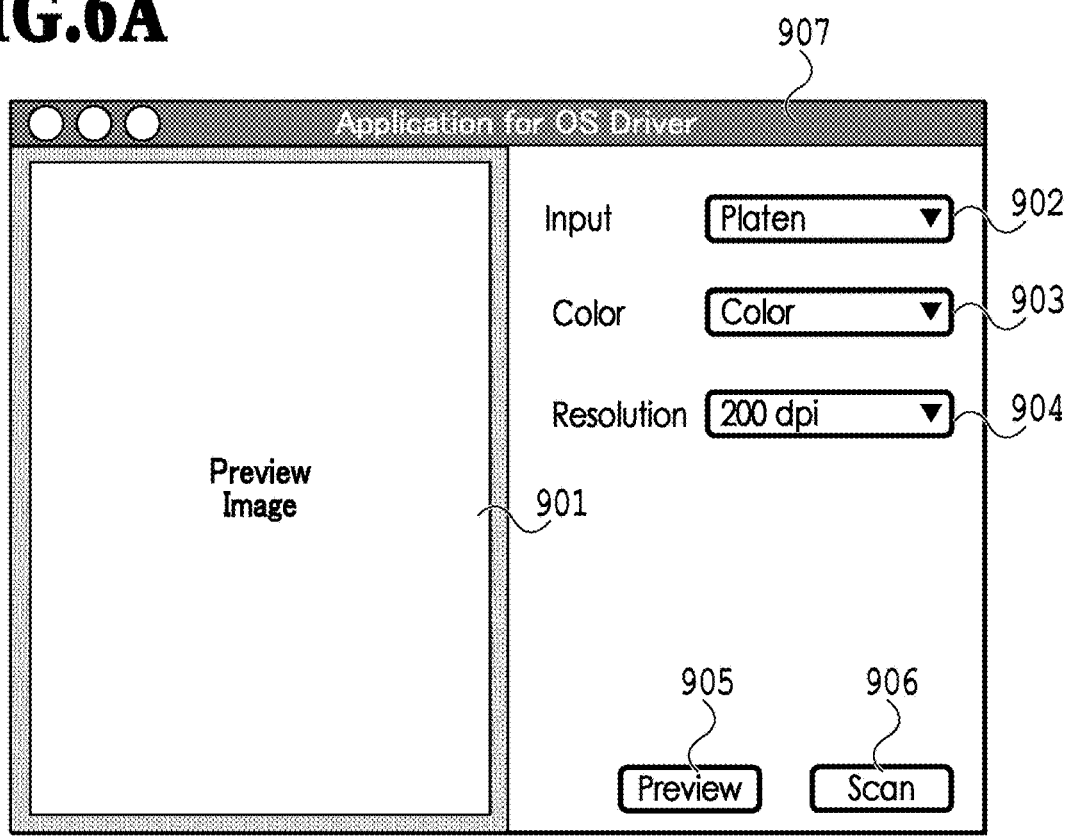

FIGS. 6A and 6B are diagrams each showing a UI screen 900. FIG. 6A shows the UI screen 900 for the vendor driver while FIG. 6B shows the UI screen for the standard driver provided by the standard library 501 (hereinafter also referred to as a UI screen 907 for the standard driver). In the case where the application 500 is a scanning application compatible with the vendor driver 502, for example, the UI screen 900 is displayed as a consequence of activation of the vendor driver 502 by the standard library 501. On the other hand, the standard library 501 displays the UI screen 907 in the case where the application 500 is a scanning application compatible with the standard driver.

Each of the UI screens 900 and 907 is provided with a region to display setting sections used for performing various settings and a region to display a preview image for displaying an image obtained by preview scan processing. Note that the regions to display common setting items and the preview image and buttons concerning the same functions in the UI screens 900 and 907 are denoted by the same reference numerals 901 to 906, respectively. As the user clicks a scanning mode setting section 902, multiple scanning modes executable by the image processing apparatus 200 are displayed so that the user can select one of the displayed scanning modes. Here, three signs of "Platen" indicating the reflection scanning in the flatbed mode, "ADF" indicating the reflection scanning in the ADF mode, and "Film" indicating the transmission scanning are selectably displayed on the UI screen 900 for the vendor driver displayed in FIG. 6A. On the other hand, only "Platen" and "ADF" are selectably displayed on the UI screen 907 for the standard driver shown in FIG. 6B without displaying "Film". Note that "Platen" is set as default both in the case of the vendor driver and in the case of the standard driver.

In a color mode setting section 903, the user can select either "Color" or "Gray (Black & White)". In a resolution setting section 904, the user can set various reading resolutions either by selection or by manual input.

A special function setting section 910 for setting a special function of the image processing apparatus 200 is displayed on the UI screen 900 for the vendor driver shown in FIG. 6A. Here, FIG. 6A shows an example of displaying a setting section for switching an unsharp function on and off. On the other hand, the special function setting section 910 is not displayed on the UI screen 907 for the standard driver shown in FIG. 6B.

A "Preview" button for instructing the preview scan processing and a "Scan" button for instructing real scan processing are displayed at a lower right part of the UI screen 900. In the case where the user clicks the "Preview" button, either the vendor driver 502 or the standard driver 503 sends the image processing apparatus 200 a scanning instruction that includes the input mode and the color mode set on the UI screen 900. The image processing apparatus 200 performs the preview scan processing based on the input mode and the color mode included in this scanning instruction, and provides the vendor driver 502 or the standard driver 503 with an obtained image. The vendor driver 502 or the standard driver 503 performs prescribed processing on the obtained image and displays the processed image on a preview image region 901. The user can crop and designate a region in the preview image displayed on the preview image region 901, on which the user would like to perform the real scan processing.

Here, a scanning instruction transmitted in the case of clicking the "Preview" button and a scanning instruction transmitted in the case of clicking the "Scan" button may be of different types from each other. In addition, the image processing apparatus 200 may execute scanning of the original in accordance with a distinct scanning method based on the type of the scanning instruction. For example, in the case where the "Preview" button is clicked, the scanning may be performed in accordance with a scanning method which is lower in resolution but higher in speed as compared to the case where the "Scan" button is clicked.

In the case where the user clicks the "Scan" button after performing the crop designation, the image processing apparatus 200 subjects the cropped and designated region to the scan processing in accordance with the set input mode, the set color mode, and the set resolution. Then, the image processing apparatus 200 sends the information processing apparatus 100 a scanned image obtained by scanning the original. The vendor driver 502 or the standard driver 503 forwards the scanned image received from the image processing apparatus 200 to the application 500. Here, the scanned image is in a raw image format, for example. In the meantime, the image processing apparatus 200 may execute the scanning in accordance with the region that is cropped and designated or transmit the scanned image in accordance with the cropped and designated region. In the former case, the optical sensors 213 may be driven only for a portion corresponding to the cropped and designated region in terms of the Y direction in FIG. 3C, for example. Then, regarding the X direction, only a portion corresponding to the cropped and designated region may be transmitted to the information processing apparatus 100, for instance. In the latter case, although the entire surface of the platen 209 is scanned, for example, only a portion corresponding to the cropped and designated region out of the scanned image may be transmitted to the information processing apparatus 100.

Figure 7:
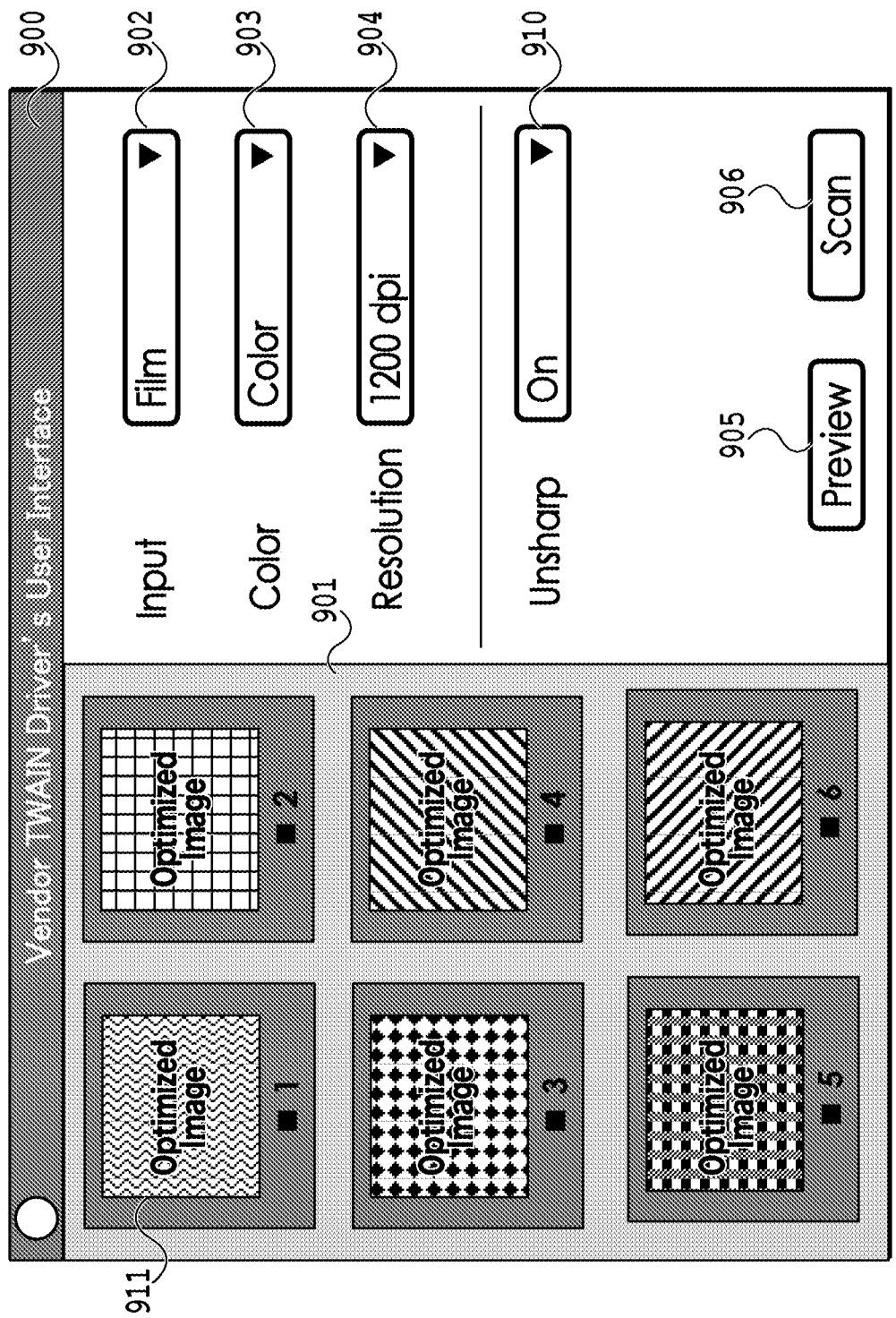
FIG. 7 is a diagram showing a UI screen 900 for a vendor driver.

FIG. 7 is a diagram showing the UI screen 900 in the case where the user clicks the "Preview" button while setting "Film" in the scanning mode setting section 902 on the vendor driver 502. In the case of setting "Film", the vendor driver 502 sends the image processing apparatus 200 a scanning instruction including the "Film" settings. Upon receipt of the scanning instruction, the image processing apparatus 200 executes the above-mentioned transmission scanning and transmits the scanned image to the information processing apparatus 100. The vendor driver 502 of the information processing apparatus 100 extracts frame images 911 corresponding to frames of a film out of the scanned image obtained from the image processing apparatus 200. Then, the vendor driver 502 displays the frame images 911 in the region 901 as preview images in an arranged state as shown in FIG. 7. FIG. 7 shows a state of displaying six frame images 911. In the case where the original is a negative film, for example, the vendor driver 502 performs image processing including negative-to-positive conversion processing. In the case where the original is a positive film, the vendor driver 502 does not perform the negative-to-positive conversion processing but performs image processing suitable for the positive film instead. In the case of a 35-mm sleeve, the vendor driver 502 divides a sequential image into multiple frame images 911. After performing the appropriate image processing or resize processing in conformity to the form of the original as mentioned above, the vendor driver 502 displays the arranged frame images in the preview image region 901. The user can perform crop designation based on the frame images 911 displayed in thumbnails.

As the user selects desired frame images 911 out of the multiple thumbnail frame images 911 and clicks the "Scan" button, the vendor driver 502 sends the image processing apparatus 200 the following instruction. Specifically, the vendor driver 502 issues a scanning instruction to the image processing apparatus 200 so as to cause the image processing apparatus 200 to execute the real scan processing on the selected frame images 911. In this instance, shooting conditions including exposure time, a shutter speed, weather, light direction, and the like at the time of shooting the relevant images may vary among the frame images 911. Given the circumstances, the vendor driver 502 analyzes respective characteristics of the frame images 911 extracted in the preview scan processing and performs the real scan processing after setting the optimal light exposure time. For example, regarding a bright frame image, the real scan processing is performed after setting short exposure time to the optical sensors 213 so as to avoid saturation of detection values of the optical sensors 213. On the other hand, regarding a dark frame image, the real scan processing is performed after setting long exposure time to the optical sensors 213 so as to expand a tone range of output values from the optical sensors 213.

Meanwhile, the vendor driver 502 issues the following instruction in the case where the user clicks the "Preview" button or the "Scan" button in the scanning mode setting section 902 on the screen for the vendor driver 502 while setting the "Platen". Specifically, the vendor driver 502 sends the image processing apparatus 200 a scanning instruction including the "Platen" settings in this case. Upon receipt of the scanning instruction, the image processing apparatus 200 executes the above-mentioned reflection scanning and transmits the scanned image to the information processing apparatus 100.

The transmission scanning described above with reference to FIG. 7 is the function executable in the case of using the vendor driver 502. The standard driver 503 that uses the standard protocol can control the image processing apparatus 200 only in the range of the reflection scanning, and does not allow setting the "Film" in the scanning mode setting section 902. In other words, the standard driver 503 cannot instruct the transmission scanning with the scanning instruction unlike the above-described case of using the vendor driver 502. For this reason, even if the transmissive original such as the film was set on the image processing apparatus 200, the user has not been able to obtain an appropriate read image in the case of using the standard driver.

In order to improve this situation, the image processing apparatus 200 of this embodiment stores a scan program for executing scan processing on a transmissive original appropriately while exchanging information with the standard driver 503 in the same form as in the case of a reflective original. To be more precise, in the case where the original loaded on the image processing apparatus 200 is the transmissive original, the CPU 201 of the image processing apparatus 200 causes the scan engine 205 to execute the preview scan processing or the real scan processing in the transmission mode. Then, the CPU 201 performs prescribed processing on the image obtained in the transmission mode so as to generate an image similar to an image obtained in the case of executing the preview scan processing or the real scan processing in the reflection mode, and this image is used for exchanging the information with the standard driver 503. Now, more details will be described below.

Figure 8:
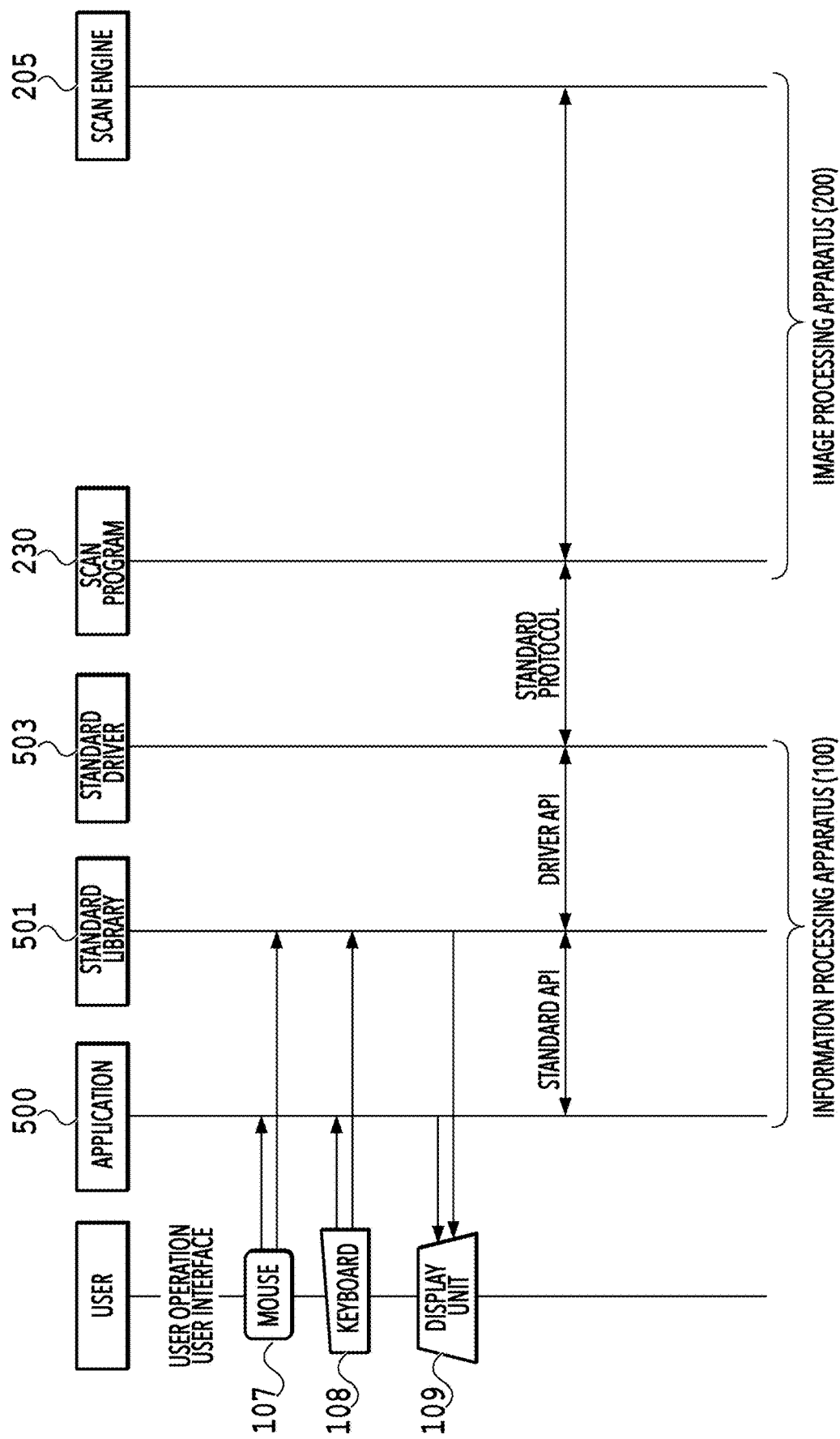
FIG. 8 is a diagram showing a configuration of control across software components.

FIG. 8 is a diagram showing a configuration of control across software components in the information processing apparatus 100 and the image processing apparatus 200 in the case of using the standard driver 503. The user gives an instruction to the image processing apparatus 200 through the mouse 107 and the keyboard 108 while checking the information by using the display unit 109. To be more precise, the user causes the standard library 501 to display the UI screen 907 as shown in FIG. 6B through the application 500, and gives various settings and instructions concerning the image processing apparatus 200 by using the UI screen 907. The application 500 exchanges the information with the standard library 501 by using a linked standard API. The standard library 501 exchanges the information with the standard driver 503 by using a driver API. The standard driver 503 exchanges the information with a scan program 230 of the image processing apparatus 200 by using the standard protocol.

The scan program 230 is a program stored in the ROM 202 of the image processing apparatus 200. In the case where a command is inputted from the standard library 501 through the standard driver 503, the CPU 201 reads the scan program 230 out of the ROM 202 and executes a variety of processing while using the RAM 203 as the work area (see FIG. 1). In other words, the CPU 201 controls the scan engine 205 in accordance with the scan program 230.

Figure 9:
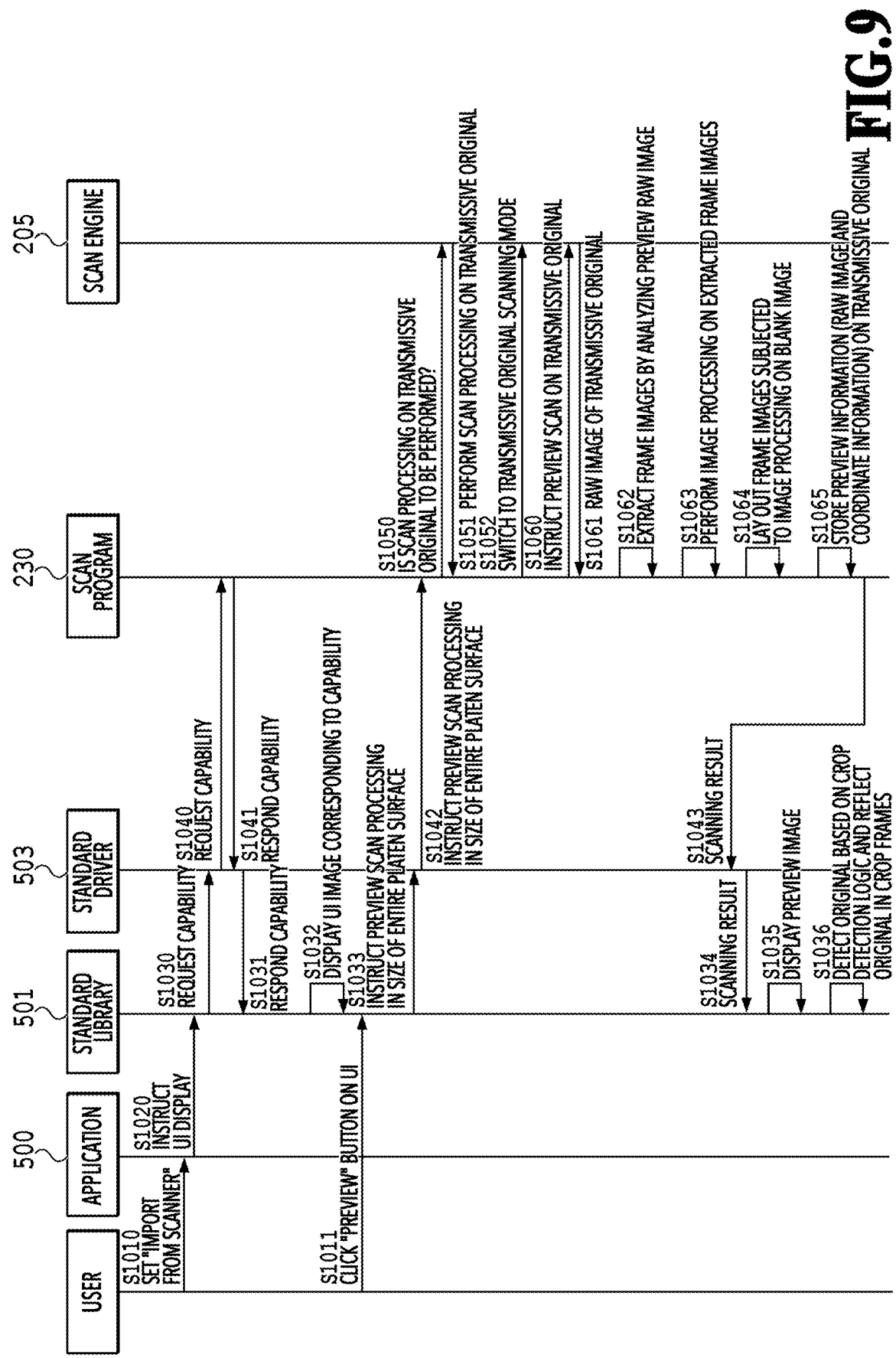
FIG. 9 is a diagram showing processing procedures in a case of instructing preview scanning.

FIG. 9 is a diagram showing processing procedures in the case where the user instructs the preview scanning through the standard driver while setting the transmissive original on the image processing apparatus 200. In FIG. 9, the application 500, the standard library 501, and the standard driver 503 are the software components executed by the CPU 101 of the information processing apparatus 100. The scan program 230 is a software component stored in the ROM 202 of the image processing apparatus 200 and executed by the CPU 201. The scan engine 205 is a hardware component to be controlled by the CPU 201 of the image processing apparatus 200 in accordance with the scan program 230.

In the case of starting this processing, the user activates the application 500 and selects a menu such as "import from scanner" (S1010). The application 500 instructs the standard library 501 provided by the linked OS to display the UI screen 900 (S1020). Here, the application 500 may instruct the standard library 501 to display the UI screen 900 at the point of activation.

Receiving the instruction, the standard library 501 requests functional information (a device capability) of a selected device from the standard driver 503 (S1030). In this example, the information indicating whether or not the ADF is installed on the image processing apparatus 200 and the like is requested as the functional information, for instance. The standard driver 503 requests the function information on the image processing apparatus 200 from the scan program 230 of the image processing apparatus 200 by using the standard protocol (S1040).

The scan program 230 delivers the functional information on the scan engine 205 to the standard driver 503 (S1041). The standard driver 503 forwards the received functional information to the standard library 501 (S1031). The standard library 501 displays the UI screen 900 as shown in FIG. 6B based on the received functional information (S1032).

In the case where the functional information indicates the installation of the ADF, for example, "Platen" and "ADF" are selectable in the scanning mode setting section 902 on the UI screen 900. In this embodiment, "Film" is not indicated as an option because the information on the compatibility with the transmissive original is not included in the functional information. The user selects a desired input mode from the displayed options and clicks a "Preview" button 905 on the UI screen 900 (S1011). Here, let us assume that the "Preview" button 905 is clicked in the state where "Platen" is selected.

Having received the "Preview" instruction, the standard library 501 instructs the standard driver 503 to perform the preview scan processing on the reflective original, or in other words, simple scan processing on the entire surface of the platen 209 (S1033). The standard driver 503 also issues the same instruction to the scan program 230 (S1042).

The scan program 230 of the image processing apparatus 200 performs the preview scan processing based on the scanning instruction received from the standard driver 503 and on the state of the original set in the image processing apparatus 200. Then, the scan program 230 subjects the scanned image obtained by the preview scan processing to prescribed image processing, and transmits the scanned image subjected to the processing to the standard driver 503 (S1043). Steps of S1050 and S1051 are procedures for allowing the scan program 230 to generate the aforementioned scanning result while controlling the scan engine 205.

Now, steps from S1050 to S1065 will be explained one by one below. Upon receipt of the instruction of the preview scan processing on the reflective original from the standard driver 503 in S1042, the scan program 230 confirms with the scan engine 205 as to whether or not the scan processing on the transmissive original is to be performed (S1050). The scan engine 205 checks an original setting state of the image processing apparatus 200 and responds to the scan program (S1051).

Various methods can be used to check the original setting state. For example, in the case where the platen protection sheet 223 is attached to the platen cover 208, the optical sensors 213 do not detect the light from the transmission light source 220 even if the transmission light source 220 is turned on. In this case, it is possible to determine that the reflective original is set on and the image processing apparatus is not in the state where scanning the original in the transmission mode is possible. Meanwhile, if a member used for scanning the original in the reflection mode, namely, the platen protection sheet 223 is not attached, then it is possible to determine that the image processing apparatus is in the state where scanning the original in the transmission mode is possible. On the other hand, in the case where any of the film guides 215 to 217 is set on the platen 209, the optical sensors 213 can detect the detection pattern 219 and thus determine that the transmissive original is set on. In the example of FIG. 9, the scan engine 205 responds to the scan program that the transmissive original has been set, or in other words, the scan processing of the transmissive original is to be executed (S1051).

Here, a not-illustrated sensor in the image processing apparatus 200 detects whether or not the platen protection sheet 223 is present or whether or not any of the film guides 215 to 217 is set on. Alternatively, the image processing apparatus 200 may execute a scanning operation and determine whether or not the platen protection sheet 223 is present or whether or not any of the film guides 215 to 217 is set on from a scanned image obtained by the scanning operation.

Next, the scan program 230 sets the scan engine 205 to a transmissive original scanning mode (S1052). Specifically, the scan program 230 turns on the transmission light source 220 and sets the scanning resolution. For example, in a case where the reading resolution of at least 300 dpi is required for the preview scan processing on the transmissive original, the reading resolution is changed to 300 dpi even if the instruction in the received command indicates a reading resolution below 300 dpi. This procedure may be omitted if the above-mentioned setting has been done already.

Then, the scan program 230 causes the scan engine 205 to execute the preview scan processing on the transmissive original (S1060). The scan engine 205 obtains detection values of the optical sensors 213 while moving the scanner bar 211 in a region of the transmissive original at a suitable speed for the preview scan processing on the transmissive original. In this embodiment, the detection values of the optical sensors 213 are RGB luminance values, and the raw image data containing the RGB luminance values corresponding to respective pixels are stored as the scanned image in the RAM 203 of the image processing apparatus 200 (S1061).

Next, the scan program 230 extracts one or more frame images 911 from the raw image obtained in S1060 (S1062).

Figure 10:
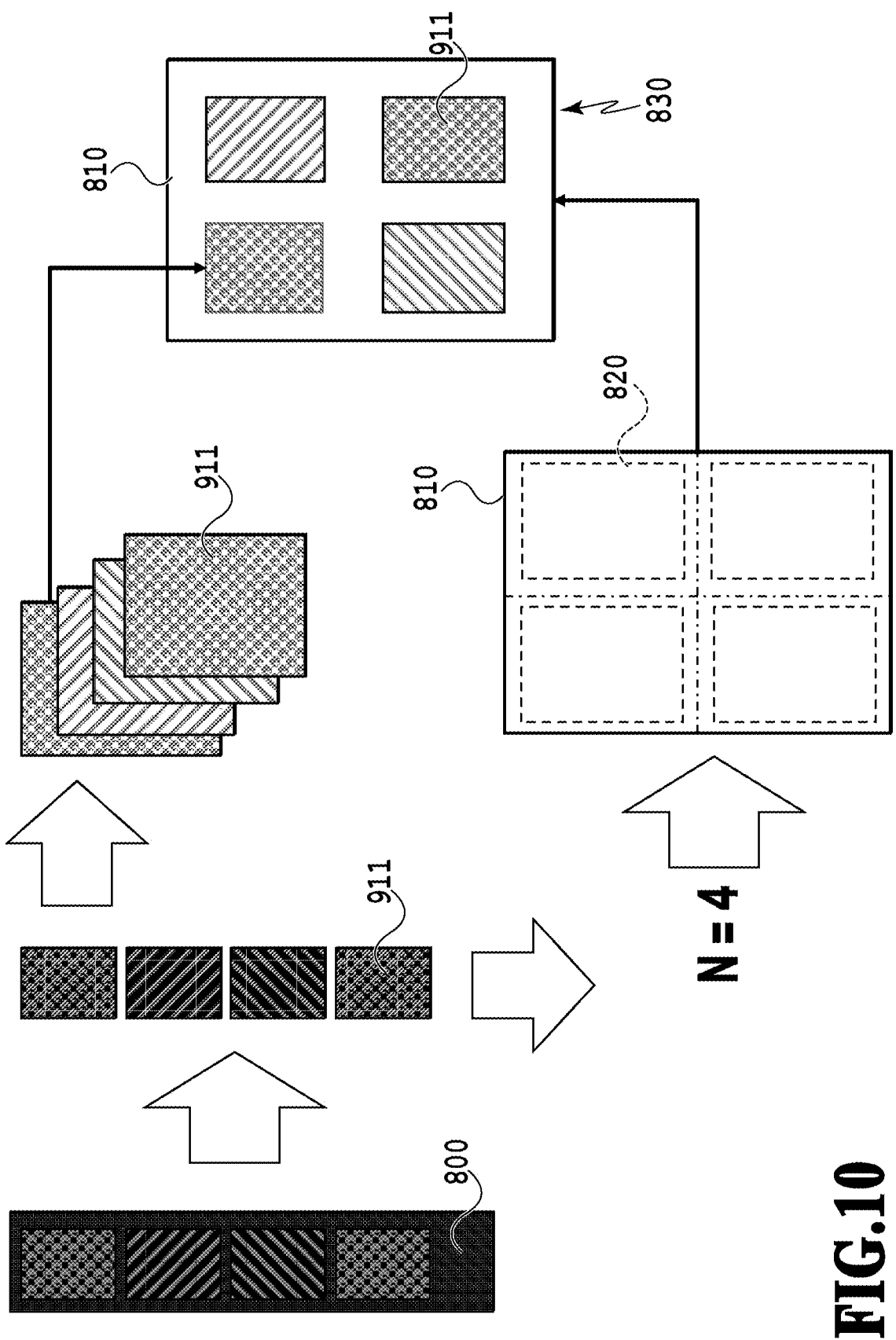
FIG. 10 is a schematic diagram for explaining image processing on an obtained raw image.

FIG. 10 is a schematic diagram for explaining the processing on the raw image obtained in S1060 to be performed by the scan program 230. FIG. 10 shows a case of setting a negative film on the sleeve film guide 215. A raw image 800 includes a frame body of the sleeve film guide 215 and four images in the set negative film.

In S1062 of FIG. 9, the scan program 230 extracts images each representing a unit of shooting as the frame images 911 out of the above-mentioned raw image 800. In this instance, the scan program 230 may use the detection pattern 219 for the film guide (see FIG. 5A) included in the raw image 800 as a reference for cutting out the frame images 911. FIG. 9 shows an example of extracting the four frame images 911 from the raw image 800.

Back to the explanation of FIG. 9, the scan program 230 analyzes the respective frames and derives image processing conditions suitable for generating a preview image 901 regarding the respective frames in S1063. The image processing conditions include a necessity of performing the negative-to-positive conversion processing, a method of color correction processing, and the like. The scan program 230 performs the image processing on each of the frame images 911 based on the derived image processing conditions (S1063).

In the case of FIG. 10, the four frame images 911 extracted in S1062 are negative images and are therefore subjected to the image processing including the negative-to-positive conversion processing, respectively. As a consequence, four positive images are obtained.

Back to the explanation of FIG. 9 again, in S1064, the scan program 230 generates a preview image 830 by using the frame images 911 subjected to the image processing in S1063.

In the case where the frame images 911 are extracted in S1062, the scan program 230 counts the number N of the extracted frame images. The number N is equal to four in the case of FIG. 10. In the meantime, the scan program 230 prepares a bitmap image that has a size (the number of pixels) obtained by the preview scan processing of the reflective original and in which all pixels are set to white (such an image will be hereinafter referred to as a blank image 810). Then, the N pieces of frame regions 820 in the same size are arranged in the blank image 810.

Figure 11:
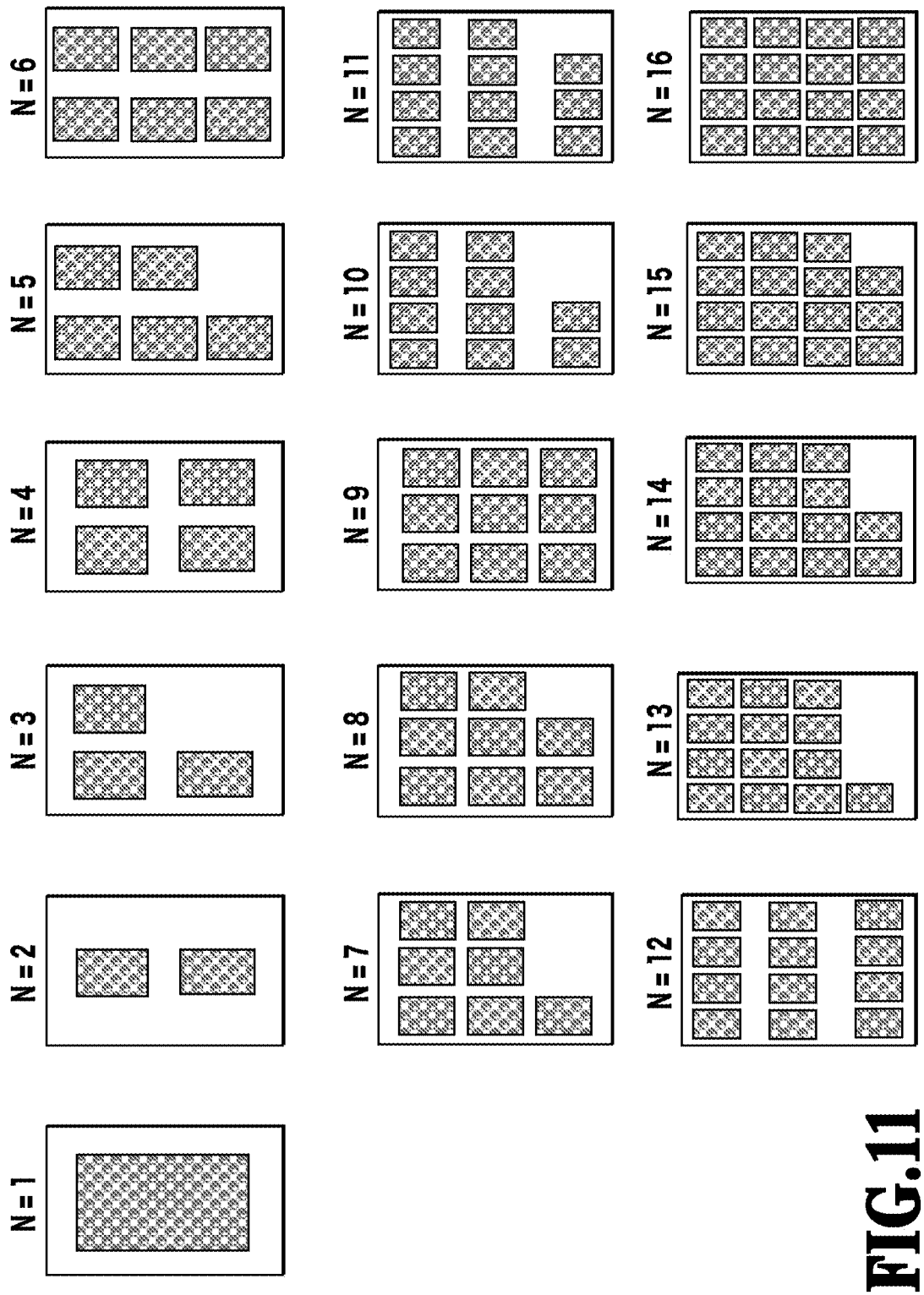
FIG. 11 is a diagram showing layouts of frame regions.

FIG. 11 is a diagram showing layouts of the frame regions 820 in the blank image 810 regarding the numbers N of frames ranging from 1 to 16. The scan program 230 sets the size and the numbers of rows and columns of the frame regions 820 such that the N pieces of the frame regions 820 in the same size are arranged evenly in the entire region of the blank image 810 no matter what the number N of frames is. FIG. 10 shows an example of arranging the four frame regions 820 into two rows and two columns in the blank image 810.

Moreover, the scan program 230 lays out the four frame images 911 generated in S1063 in the four frame regions 820, respectively (S1064). In this way, the preview image 830 is generated as shown in FIG. 10.

Meanwhile, in the case of laying out the frame images 911 in the frame regions 820, each of the frame images 911 needs to be resized at an appropriate enlargement rate with respect to the corresponding frame region 820.

Figure 12:
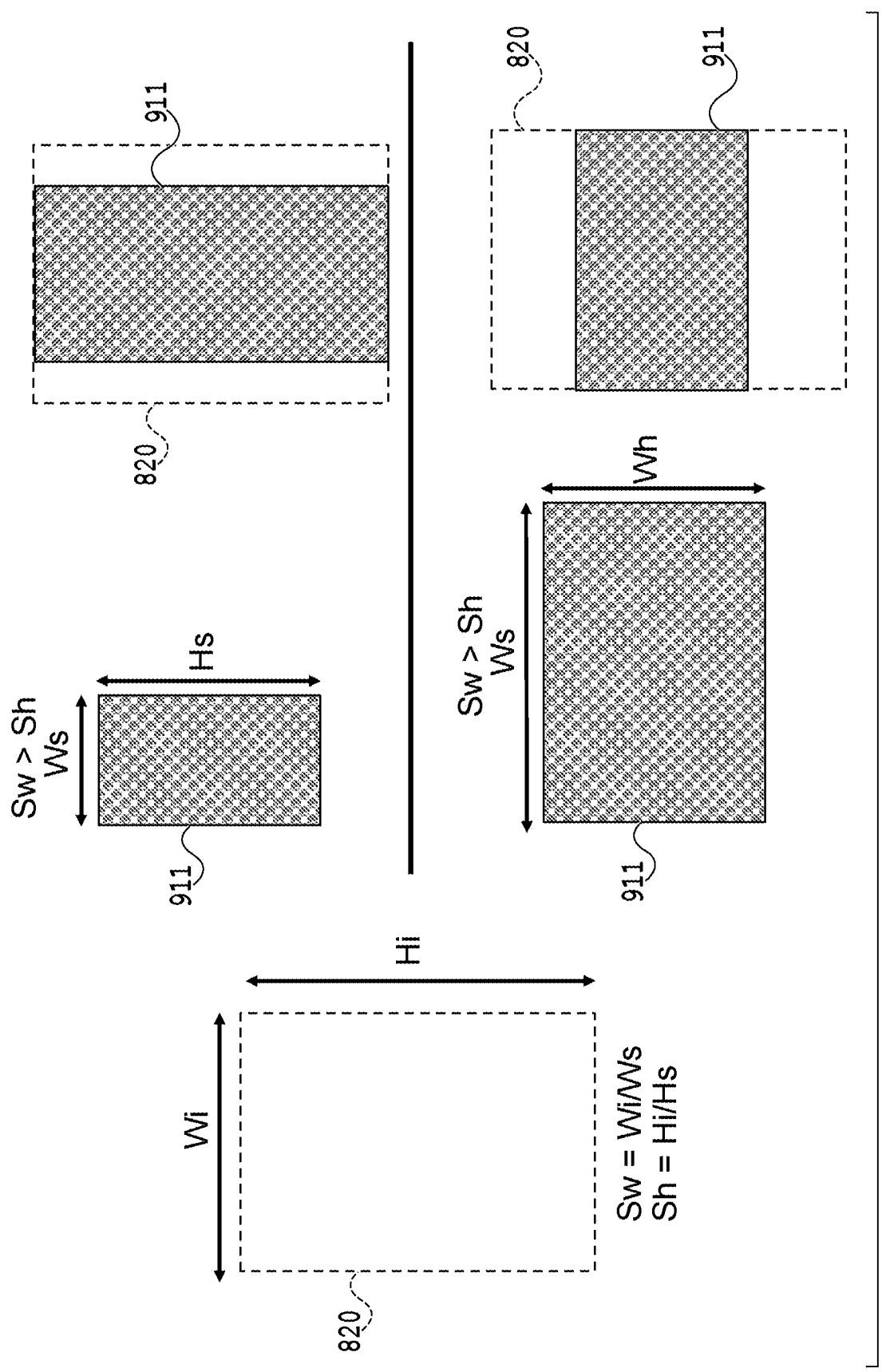
FIG. 12 is a diagram showing a method of resizing frame images.

FIG. 12 is a diagram showing a method of resizing the frame image 911. Here, a width of the frame region 820 is indicated with Wi, a height of the frame region 820 is indicated with Hi, a width of the frame image 911 is indicated with Ws, and a height of the frame image 911 is indicated with Hs. The scan program 230 calculates a rate of the frame region 820 relative to the frame image 911 in terms of the width direction (Sw=Wi/Ws) and a rate of the frame region 820 relative to the frame image 911 in terms of the height direction (Sh=Hi/Hs). Then, the frame image 911 is enlarged in accordance with the smaller one of those rates and is laid out in the frame region 820. In FIG. 12, an upper part shows a case where Sw>Sh holds true. In this case, the frame image 911 is enlarged by using the rate Sh in the height direction and is laid out in the frame region 820. A lower part therein shows a case where Sw<Sh holds true. In this case, the frame image 911 is enlarged by using the rate Sw in the width direction and is laid out in the frame region 820. The multiple frame images 911 may include landscape pictures and portrait pictures. In the case where every picture includes information that enables identification of the vertical direction, the above-described processing may be performed after turning the frame images 911 so as to align the vertical directions of all the pictures.

If the respective frame images 911 are arranged at regular intervals as shown in FIG. 10, the standard library 501 that receives the preview image 830 can easily generate crop frames later. It is to be noted, however, that the above-described layout method is a mere example and the user may customize the numbers of rows and columns, the layout positions, and the sizes of the frames in advance. In the meantime, if the standard library 501 does not set the crop frames, then the scan program 230 may draw thumbnail frames in the preview image 830 in S1064 so that the user can perform crop work easily.

Back to the explanation of FIG. 9 again, in the case where the preview image 830 is obtained as shown in FIG. 10, the scan program 230 stores preview information in a memory, which will be required in a case of receiving the next scanning instruction (S1065). To be more precise, the raw image 800 obtained in the preview scan processing and correspondence information between the coordinates of each frame image on the platen and the coordinates thereof in the preview image are stored in the memory (S1065).

FIGS. 13A to 13C are diagrams for explaining coordinate information. FIG. 13A shows an x-coordinate and a y-coordinate of a frame image 911 extracted from the raw image 800. The point of origin O shows the point of origin for reading on the platen 209. FIG. 13B shows an x-coordinate and a y-coordinate of the resized frame image 911 in the preview image 830. The point of origin O' shows the point of origin of the preview image 830. In S1065, the scan program 230 associates the aforementioned types of the coordinate information with each of the frame images 911 and stores the frame images 911 in the memory. FIG. 13C shows a state of storage in the memory. Note that the coordinate information will be used in the real scanning to be described with reference to FIG. 16.

Back to the explanation of FIG. 9 again, the scan program 230 transmits the generated preview image 830 to the standard driver 503 (S1043). Regarding the instruction for the preview processing on the reflective original (S1042), the standard driver 503 receives the preview image 830 in the same size as that in a case of actually performing the preview processing on the reflective original as an output image of a scanning result in S1043. That is to say, in the subsequent procedures, the standard driver 503, the standard library 501, and the application 500 can perform preview display of the data received in the same processing as the processing in the case of performing the preview scan processing on the reflective original.

The standard driver 503 forwards the scanning result received from the scan program 230 to the standard library 501 (S1034). The standard library 501 generates the preview image by using the obtained scanning result and displays the preview image on the region 901 of the UI screen 900 (S1035). Moreover, the standard library 501 generates the crop frames based on a prescribed crop detection logic and displays the crop frames on the preview image in the region 901 (S1036).

Figure 14:
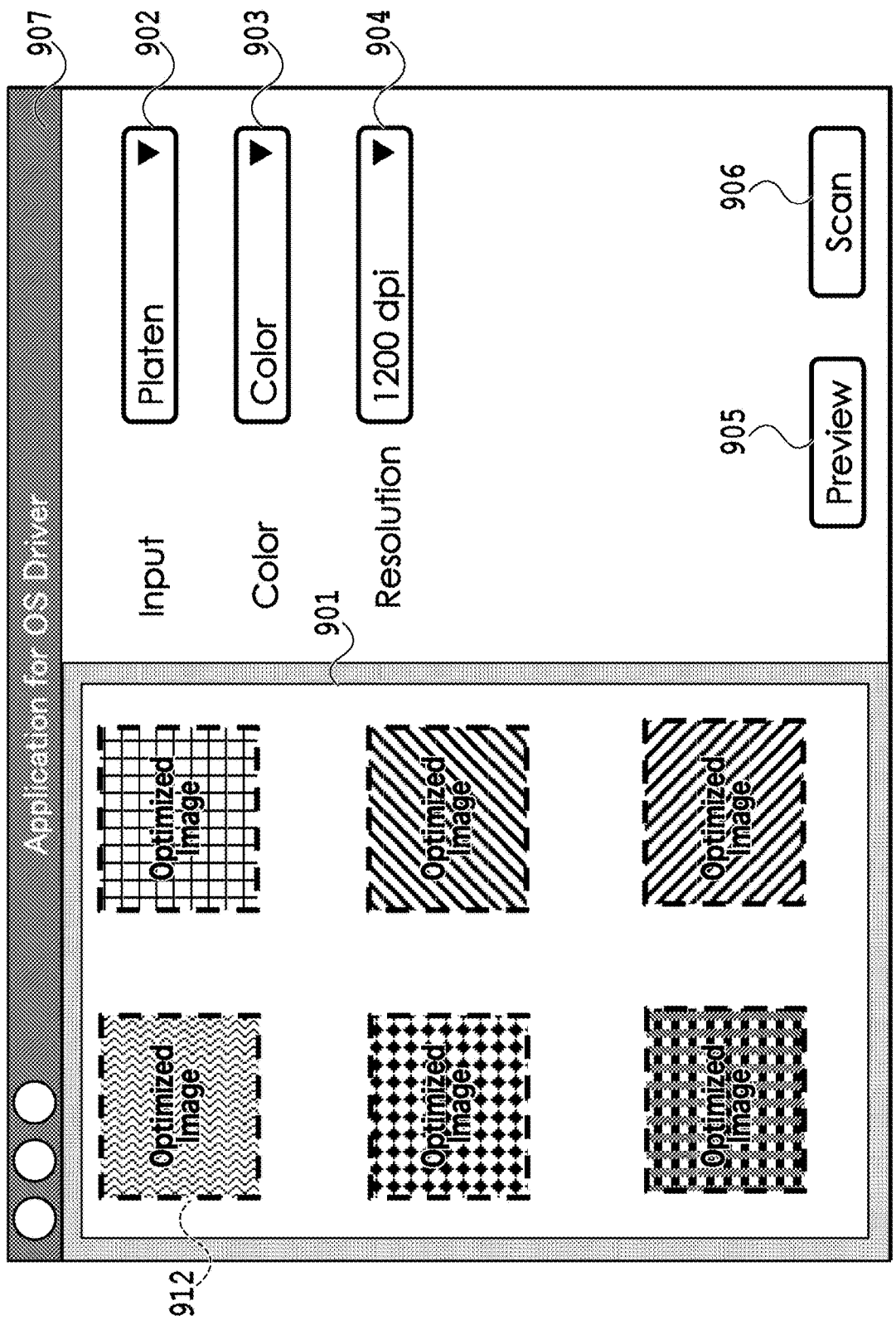
FIG. 14 is a diagram showing an example of the UI screen.

FIG. 14 is a diagram showing an example of the UI screen 907 to be displayed on the display unit 109 in S1036. This diagram shows a case of extracting six frame images 911. Here, the respective frame images 911 are laid out in an arrangement as shown in FIG. 14 regardless of whether the film set on the image processing apparatus 200 is the sleeve film guide 215 or the slide film guide 216. Meanwhile, in the case where the set film is the negative film, the respective frame images 911 are displayed in the preview image region 901 in the state after being subjected to the negative-to-positive conversion processing. In the preview image region 901, crop frames 912 used for designating a scanning region in the case of performing the real scanning are selectably arranged on the respective frame images 911.

As described above, the scan program 230 of this embodiment performs the preview scan processing appropriate for the transmissive original (S1051 to S1061) while receiving the command of the preview scan processing on the reflective original from the standard driver 503 (S1042). Then, the scan program 230 subjects the obtained image to the processing appropriate for a transmission image such as the extraction of the frame images and the negative-to-positive conversion processing, thereby generating the preview image equivalent to a reflective image (S1062 to S1065).

Figure 15:
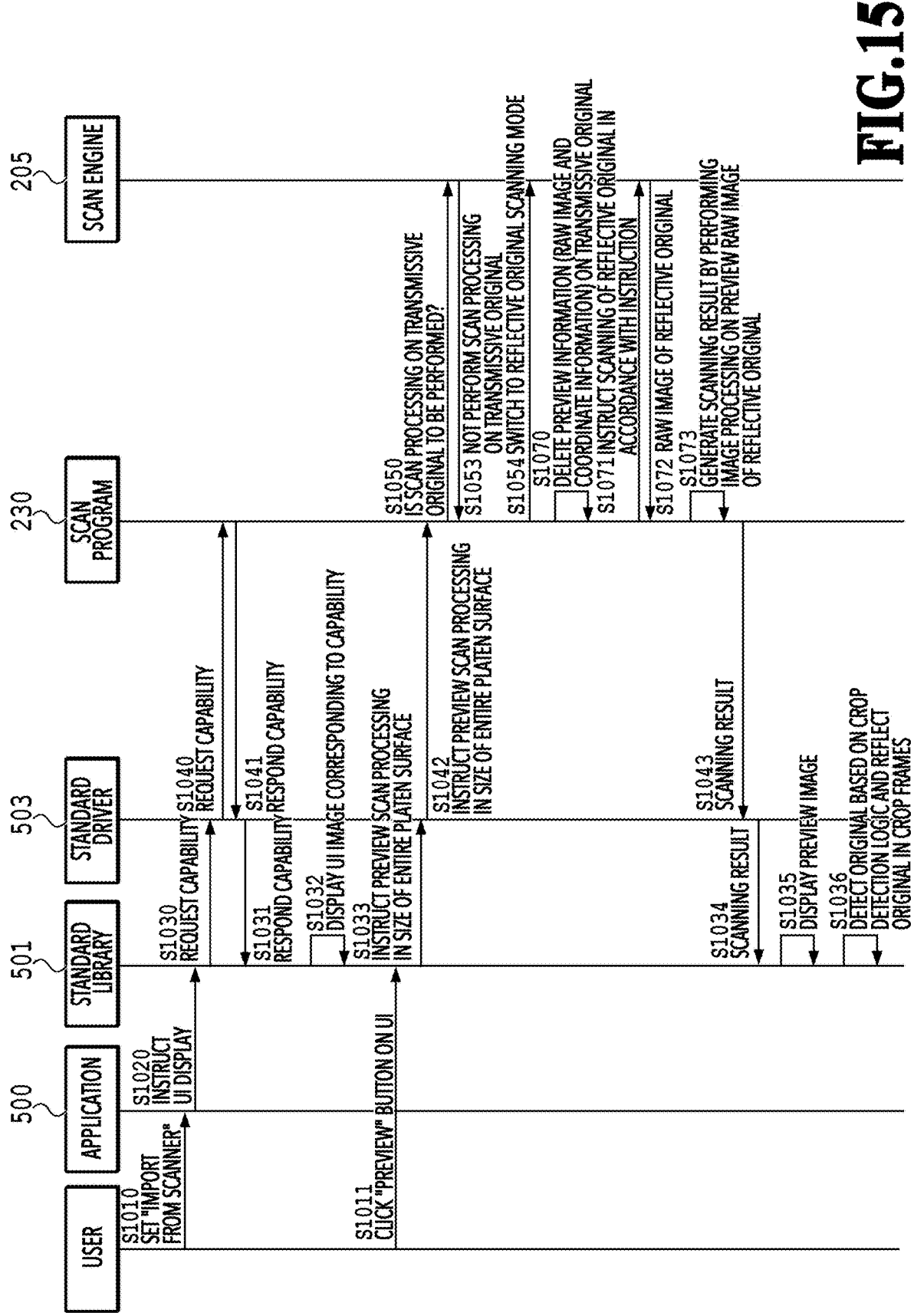
FIG. 15 is a diagram showing processing procedures in the case of instructing the preview scanning.

FIG. 15 is a diagram showing processing procedures in a case where the user performs the preview through the standard driver while setting the reflective original on the image processing apparatus 200. Note that procedures other than transactions between the scan program 230 and the scan engine 205 are the same as the corresponding procedures described with reference to FIG. 9 and explanations thereof will be omitted here.

In this example, in reply to an inquiry from the scan program 230 in S1050, the scan engine 205 responds that the reflective original is in the set state, or in other words, that the scan processing on the transmission scanning is not performed (S1053).

In this case, the scan program 230 sets the scan engine 205 to a reflective original scanning mode. Specifically, the reflection light source 212 is turned on and the resolution in the preview scan processing is set for the reflective original (S1054). This procedure may be omitted in the case where these settings have been done already.

Next, the scan program 230 deletes the preview information on the transmissive original, that is, the raw image 800 and the coordinate information on the respective frame images stored in S1065 of FIG. 9 (S1070).

Then, the scan program 230 causes the scan engine 205 to execute the preview scan processing on the reflective original (S1071). Upon receipt of this instruction, the scan engine 205 performs read processing under settings suitable for the reflective original. Specifically, the scan engine 205 moves the scanner bar 211 with the reflection light source 212 turned on across the entire region of the platen 209 at a speed suitable for the preview scan processing on the reflective original, thus obtaining the detection values from the optical sensors 213. Then, the detection values are stored in the memory as the scanned image in the raw format (S1072). The scan program 230 generates the preview image 830 by subjecting the obtained raw image to the image processing suitable for the reflective original (S1073), and transmits the generated preview image 830 to the standard driver 503 as the scanning result (S1043).

As described above, even in the case where the preview command for the reflective original is received from the information processing apparatus 100, the scan program 230 of the image processing apparatus 200 appropriately switches the mode of the preview scan processing depending on the type of the set original. In this way, the application 500, the standard library 501, and the standard driver 503 of the information processing apparatus 100 can perform the preview processing on the reflective original regardless of the type of the original actually set on the image processing apparatus 200.

Figure 16:
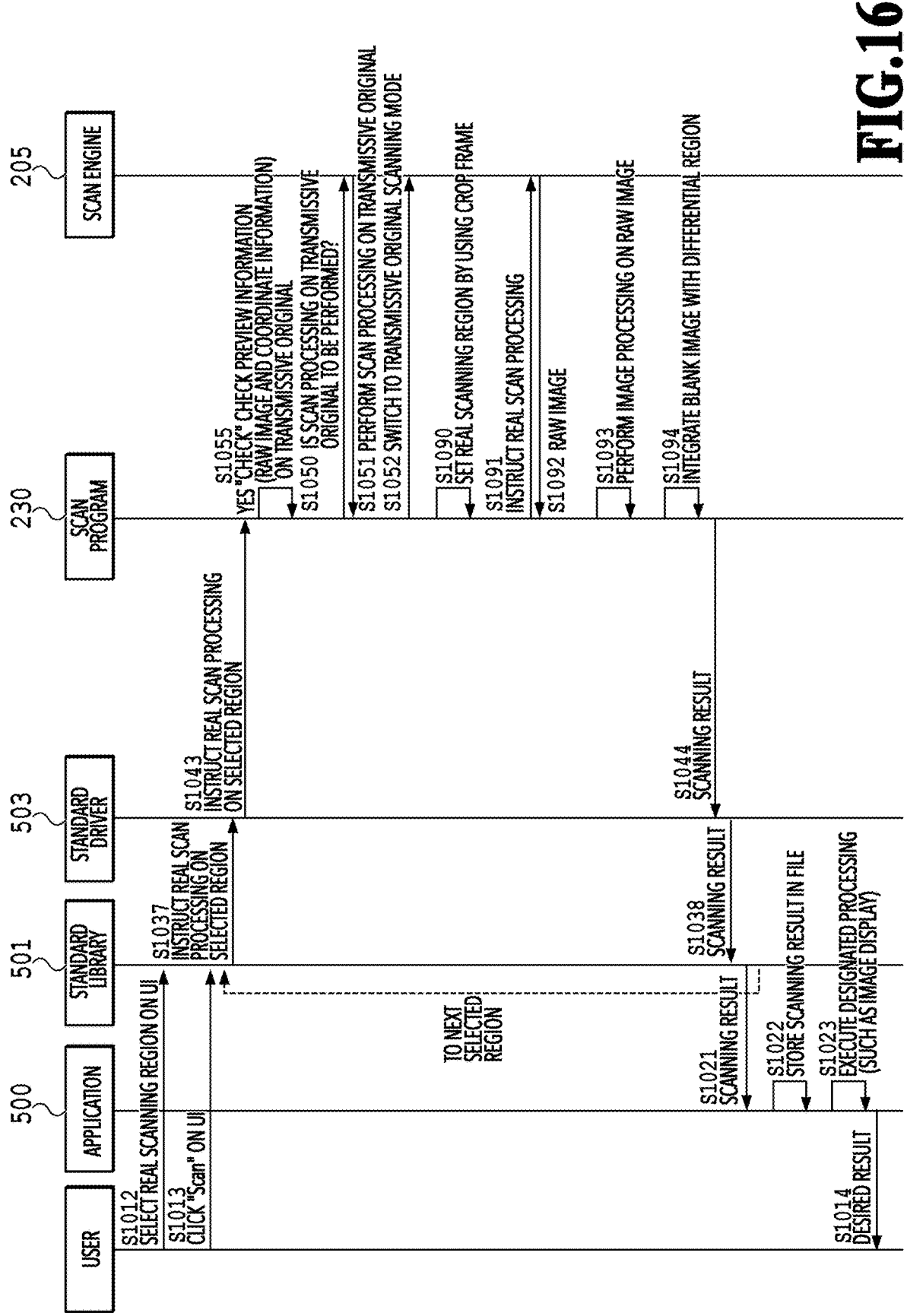
FIG. 16 is a diagram showing processing procedures in a case of performing real scan processing.

FIG. 16 is a diagram showing processing procedures in the case of performing the real scan processing based on the preview image obtained in the preview scan processing described with reference to FIG. 9. The user selects each frame image 911 to be subjected to the real scanning by using the corresponding crop frame 912 on the preview image in the region 901 of the UI screen 900 shown in FIG. 14 (S1012). In this case, the user can adjust the size of the crop frame 912 relative to the frame image 911. Moreover, the user can select two or more frame images 911 at the same time. Furthermore, the user can also set the reading mode and the reading resolution during the real scanning by using the color mode setting section 903 and the resolution setting section 904. In the case where the settings are completed, the user clicks a scan button 906 (S1013).

The standard library 501 that receives the command generates items necessary for the real scan processing, such as the coordinate information corresponding to each of the set crop frames 912 and the resolution set by using the resolution setting section 904, and instructs the standard driver 503 to perform the real scanning (S1037). The standard driver 503 transmits the instruction to the scan program 230 (S1043).

The scan program 230 checks whether or not the preview information that was stored at the time of performing the preview scan processing (S1065) is stored in the memory (S1055). If the preview information is not stored, the scanning of the transmissive original is not ready. Accordingly, the processing proceeds to a real scan sequence for the reflective original. Here, the explanation will be continued on the assumption that the preview information is stored. Note that the case where the preview information is not stored will be described later with reference to FIG. 22.

Next, the scan program 230 inquires of the scan engine 205 as to whether or not the image processing apparatus 200 is in the state of setting the transmissive original (S1050). The scan engine 205 checks the setting condition of the original in the image processing apparatus 200 and responds to the scan program (S1051). In the case where the image processing apparatus 200 is in the state where the transmissive original is set, the scan program 230 sets the scan engine 205 to the transmissive original scanning mode. To be more precise, the scan program 230 turns the transmission light source 220 on, for instance (S1052).

Then, the scan program 230 obtains (decodes) coordinates of a real scanning region on the platen based on the real scanning region indicated by the setting items received from the standard driver 503. To be more precise, the coordinate information of the preview information stored in the preview scan processing as shown in FIG. 13C is read out of the memory. Then, the real scanning region to actually read the image in the real scanning is obtained based on crop frame coordinates indicated by the standard driver 503 while referring to this coordinate information (S1090).

FIG. 17 is a diagram for explaining a method of calculating a real scanning region. In FIG. 17, "crop coordinates" indicate coordinates of a frame image n selected from the preview image in the preview image region 901 by using the crop frame. Meanwhile, "scan coordinates" indicate coordinates of the frame image n in the raw image 800 stored in the memory during the preview scan processing. Moreover, "image coordinates" indicate coordinates of the resized frame image n in the preview image 830 stored in the memory during the preview scan processing. The "scan coordinates" and the "image coordinates" are stored as the coordinate information in S1065.

First, the scan program 230 calculates scales based on the scan coordinates and the image coordinates. As for the scales, ratios between the size of the frame n in the raw image 800 and the size of the resized frame n in the preview image 830 are calculated in terms of the width and the height ($\Delta X$, $\Delta Y$), respectively. Meanwhile, the scan program 230 calculates offset amounts (UL', UT') between the crop coordinates and the image coordinates.

Next, the scan program 230 calculates reference coordinates (UL", UT") of the region to be subjected to the real scanning in the scan coordinates based on the scales ($\Delta X$, $\Delta Y$), the offset amounts (UL', UT'), and the scan coordinates (SL, ST). In the meantime, the scan program 230 calculates the width and the height (UL"±W'−1, UT"+H"−1) of the region to be subjected to the real scanning in the scan coordinates based on information on the width and the height (W, H) in the crop coordinates and on the scales (ΔX, ΔY).

Figure 18:
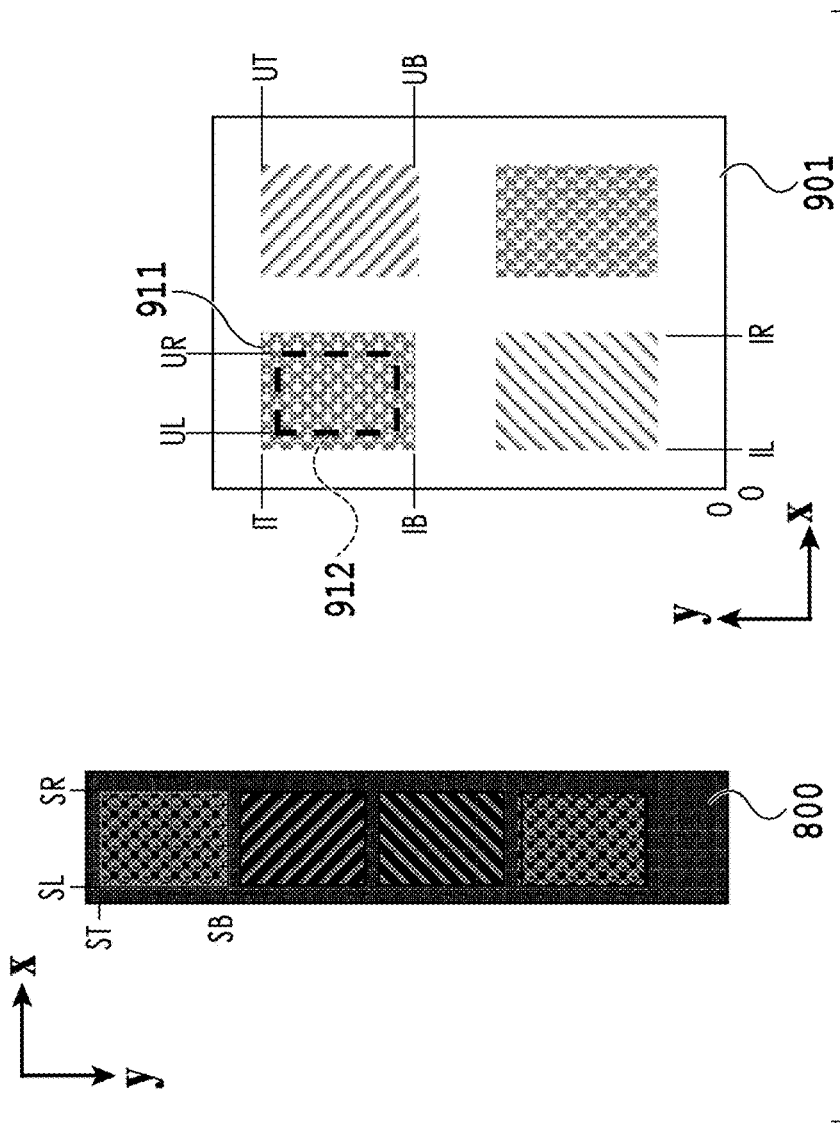
FIG. 18 is a diagram showing a correspondence between crop coordinates and raw image coordinates.

FIG. 18 is a diagram showing a correspondence between the coordinates of the crop frame 912 in the preview image region 901 and reading coordinates in the raw image 800. A reading region in the raw image 800 in the case of cropping the inside of the frame image 911 is calculated based on calculation formulae shown in FIG. 17. Note that FIG. 18 shows a case where the frame image does not undergo rotation processing during the generation of the preview image region 901.

Back to the explanation of FIG. 16, after the real scanning region is determined in S1090, the scan program 230 analyzes an image in the region corresponding to the real scanning region in the raw image stored as the preview information, thus setting a scanning condition such as light exposure time. Then, the scan program 230 causes the scan engine 205 to execute a real scanning operation under the set scanning condition (S1091).

The scan engine 205 performs the real scan processing on the region designated in accordance with the specified scanning condition, and stores the obtained raw image in the memory (S1092). The scan program 230 performs the image processing on the raw image obtained in the real scan processing in accordance with an image processing condition obtained by analyzing the image of the region corresponding to the real scanning region in the raw image stored in the preview scan processing (S1093).

Next, the scan engine 205 fills a differential region between the real scanning region corresponding to the crop frame 912 and the region actually scanned by the scan engine 205 with a blank image, thus generating an image corresponding to the size of the crop frame 912 designated by the user (S1094).

The scan program 230 sends the standard driver 503 the generated image as a real scanning result (S1044). The standard driver 503 forwards the scanning result received from the scan program 230 to the standard library 501 (S1038).

Here, in the case where the real scanning of the multiple regions (the crop frames 912) are instructed on the UI screen 907, the standard library 501 repeats the real scan processing on the next regions in the number equal to the number of the designated regions in S1037. Then, after obtaining the scanning results of all the selected regions, the standard library 501 delivers the obtained scanning results to the application 500 (S1021).

Thereafter, the application 500 continues the processing in accordance with instructions received from the user, such as storing the received scanning results in the memory (S1022) and displaying the scanning results on the display unit 109 (S1023). Hence, the processing is completed.

Figure 19A:
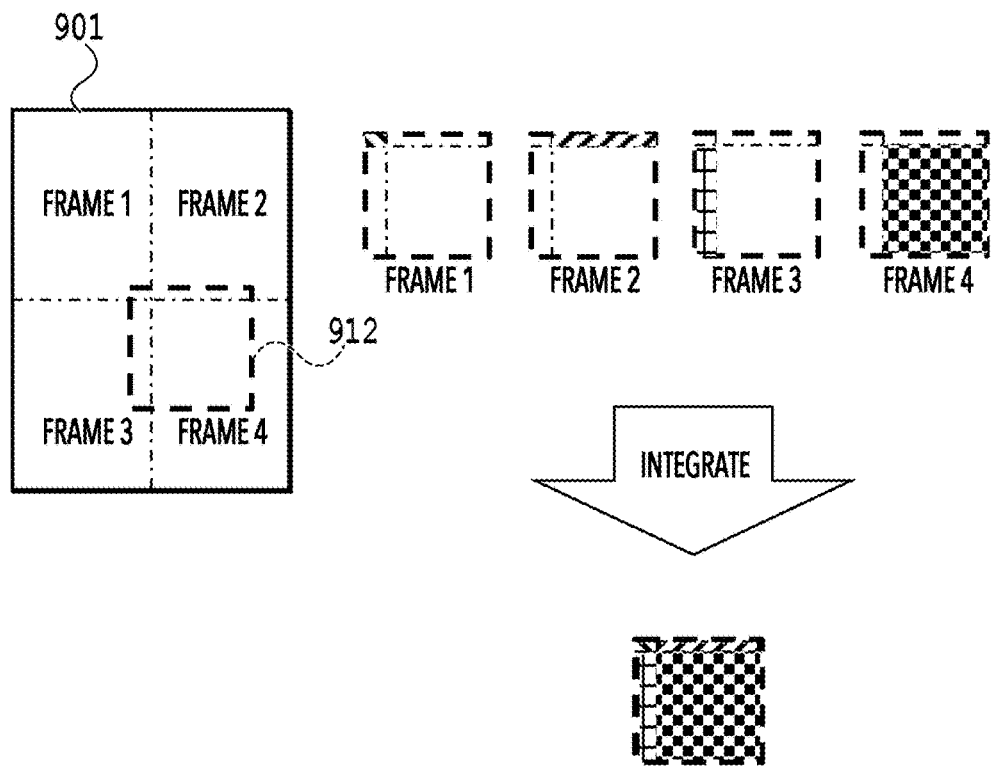
FIGS. 19A and 19B are diagrams showing examples of the real scan processing.
Figure 19B:
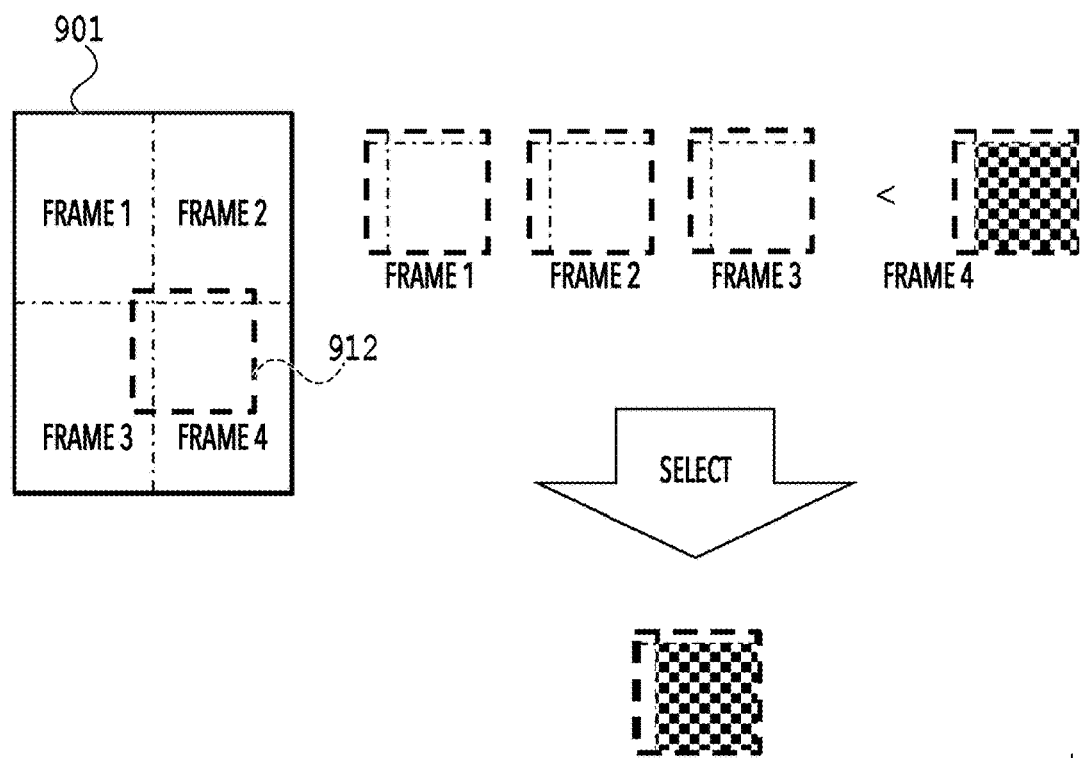

FIGS. 19A and 19B are diagrams showing examples of the real scan processing in the case where the crop frame 912 is set on the preview image region 901 in such a way as to include multiple frame images. Although the four frame images 911 are arranged vertically and horizontally in the preview image region 901, these images are images arranged in a line in the raw image.

FIG. 19A shows an example in which the real scan processing is performed on all the frame images included in the crop frame 912, then regions included in the crop frame 912 are cut out of the respective frame images and integrated together. FIG. 19B shows a method of selecting the frame image 911 having the largest area from the multiple frame images 911 included in the crop frame 912, then performing the real scan processing only on the selected frame image 911, and obtaining only the region included in the crop frame 912 therefrom. Any of these methods may be adopted to this embodiment. Alternatively, the user may be enabled to designate which method to adopt in advance.

Figure 20A:
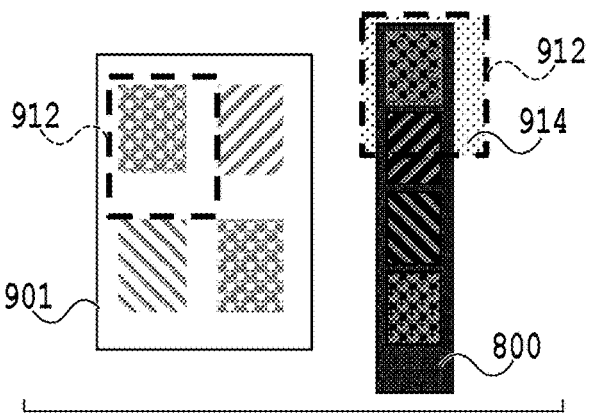
FIGS. 20A to 20C are diagrams showing examples of the real scan processing.
Figure 20B:
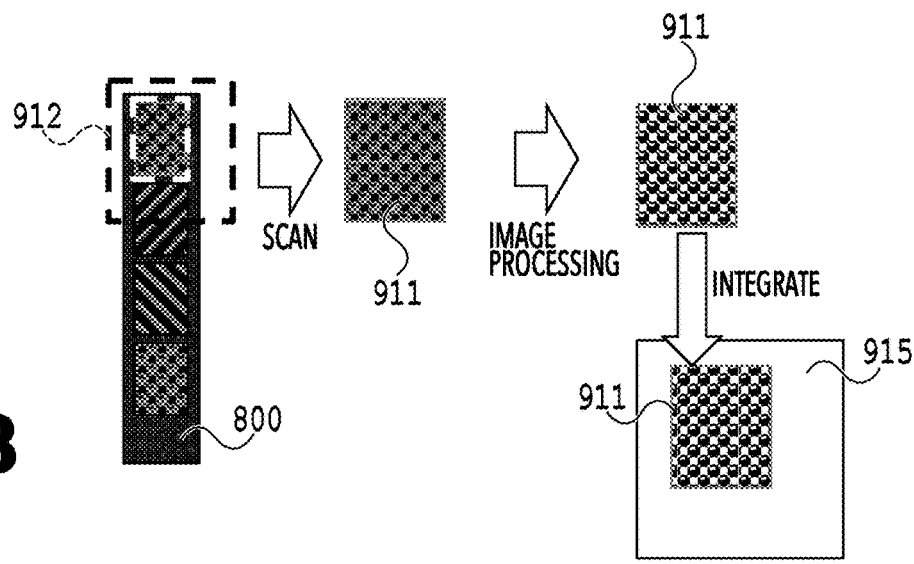
Figure 20C:
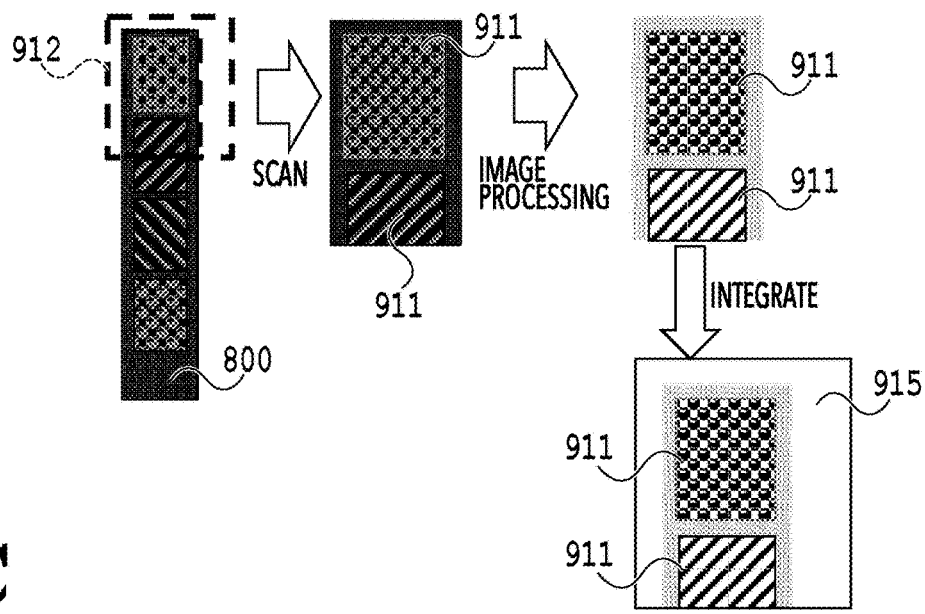

FIGS. 20A to 20C are diagrams showing examples of the real scan processing in a case where the crop frame 912 in the preview image region 901 runs off a readable range of the transmissive original. FIG. 20A shows a state in which the crop frame 912 designated in the preview image region 901 is projected on the raw image 800. The region corresponding to the crop frame 912 includes an unreadable region 914 outside the readable range of the transmissive original.

FIG. 20B shows an example of performing the real scan processing on the frame image 911 having the largest area of the multiple frame images 911 included in the crop frame 912. On the other hand, FIG. 20C shows an example of performing the real scan processing on all the regions included in the readable range out of the regions corresponding to the crop frame 912 of the raw image 800. In each case, the scan program 230 performs the prescribed image processing on the obtained raw image, and generates the scanning result by integrating the processed image with a blank image 915 in a size corresponding to the crop frame 912. Any of these methods may be adopted to this embodiment. Alternatively, the user may be enabled to designate which method to adopt in advance.

FIG. 21 is a diagram showing processing procedures in the case where no transmissive original is set on the image processing apparatus 200 at the time of performing the real scan processing. Note that procedures other than transactions between the scan program 230 and the scan engine 205 are the same as the corresponding procedures described with reference to FIG. 16 and explanations thereof will be omitted here.

In the case where no transmissive original is set on the image processing apparatus 200, the scan engine 205 responds to the scan program 230 that the real scan processing on the transmissive original is infeasible in reply to the inquiry from the scan program 230 (S1053). Upon receipt of the response, the scan program 230 sets the scan engine 205 to the reflective original scanning mode (S1054). Then, the scan program 230 deletes the preview information on the transmissive original remaining in the memory (S1070).

Next, the scan program 230 instructs the scan engine 205 to perform the real scanning in accordance with the setting received from the standard driver 503 (S1071). Upon receipt of the instruction, the scan engine 205 executes the reflection scanning in accordance with the designated settings (S1072). The scan program 230 performs the image processing suitable for the reflective original on the raw image obtained in S1072, thereby generating the real scanning result (S1073). Then, the scan program 230 transmits the generated real scanning result to the standard driver 503 (S1043).

Meanwhile, FIG. 22 is a diagram showing the processing procedures in the case where the scan program 230 determines in S1055 of FIG. 21 that the preview information is not stored. In the case where the preview information is not stored, the real scan processing on the transmissive original is not ready. Accordingly, the scan program 230 proceeds directly to S1071 without having to switch the scanning mode or to delete the preview information, and instructs the scan engine 205 to perform the real scanning according to the instruction from the standard driver 503.

Figure 23B:
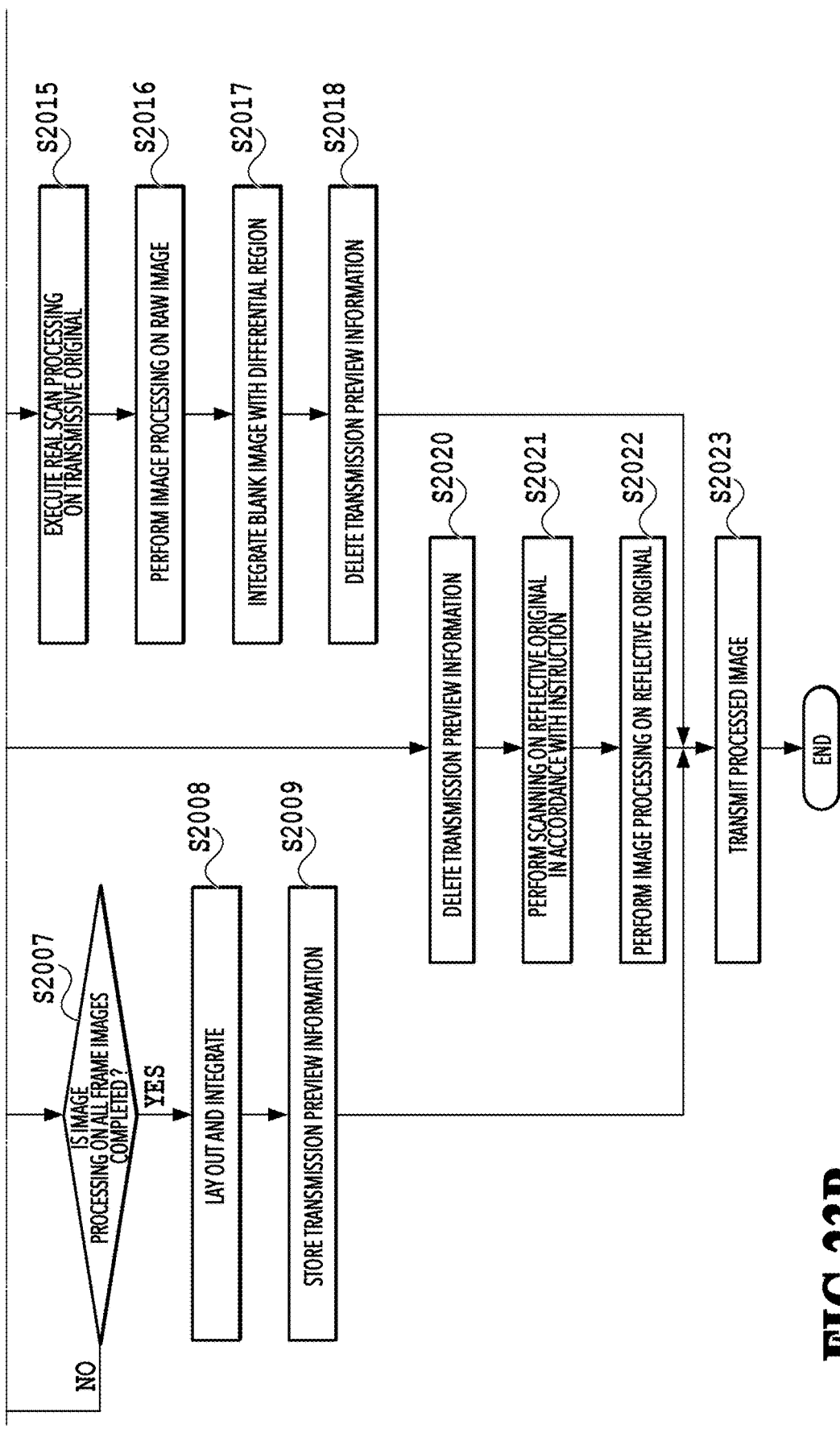
FIG. 23B is a flowchart showing processing to be executed by a CPU of the image processing apparatus.

FIG. 23 is a flowchart for explaining the processing to be executed by the CPU 201 of the image processing apparatus 200 in the case of receiving a scan command from the standard driver 503 of the information processing apparatus 100. The CPU 201 executes this processing in accordance with the scan program 230 stored in the ROM 202 while using the RAM 203 as the work area.

As the processing is started, the CPU 201 determines whether or not the scan command is the command for the preview scan processing or the command for the real scan processing (S2001). Then, the CPU 201 proceeds to S2002 in the case where the command is the command for the preview scan processing, or proceeds to S2010 in the case where the command is the commend for the real scan processing.

In S2002, the CPU 201 checks the original setting state of the image processing apparatus 200. Then, the CPU 201 proceeds to S2003 in the case where the CPU 201 confirms that the transmissive original is set on, or proceeds to S2020 in the case where the CPU 201 determines that no transmissive original is set on.

In S2003, the CPU 201 sets the scan engine 205 to a transmissive original reading mode. Specifically, the CPU 201 turns on the transmission light source 220 or sets the scanning resolution.

In S2004, The CPU 201 executes the preview scan processing on the transmissive original under the conditions set in S2003, and stores the obtained raw image in the memory. In S2005, the scan program 230 selects one or more frame images 911 from the obtained raw image 800.

In S2006, the CPU 201 sets the image processing conditions suitable for one of the extracted frame images 911 and performs the image processing in accordance with the image processing conditions thus set. This image processing on each of the frame images 911 is repeated until the CPU 201 determines in S2007 that image processing on all the frame images 911 is completed.

As the image processing on all the frame images 911 is completed, the CPU 201 resizes the frame images 911 subjected to the image processing depending on the number of frames, and generates the preview image 830 by integrating the frame images 911 in S2008.

In S2009, the CPU 201 stores the coordinate information on the respective frame images 911 in the memory as the preview information together with the raw image obtained in S2004.

Meanwhile, in the case where the CPU 201 determines in S2001 that the received scan command is the command for the real scan processing, the CPU 201 proceeds to S2010 to check whether or not the preview information is stored in the memory. In the case where it is confirmed that the preview information is there, the CPU 201 checks the original setting state of the image processing apparatus 200 in S2011. Then, the CPU 201 proceeds to S2012 in the case where the CPU 201 confirms that the transmissive original is set on, or proceeds to S2020 in the case where the CPU 201 determines that no transmissive original is set on.

In S2012, the CPU 201 calculates the real scanning region based on the designated crop frame 912 and on the preview information stored in the memory.

In S2013, the CPU 201 determines whether not the real scanning region obtained in S2012 is within the range readable by the scan processing on the transmissive original. If the real scanning region runs off the readable range, the CPU 201 corrects the real scanning region in S2014. On the other hand, in the case where the real scanning region is included in the readable range, the CPU 201 skips to S2015.

In S2015, the CPU 201 performs the real scan processing on the transmissive original. In S2016, the CPU 201 performs the image processing on the raw image obtained in S2015, in accordance with the image processing conditions obtained by analyzing the images in the regions corresponding to the real scanning region out of the raw images in the preview information.

In S2017, the CPU 201 fills the differential region between the real scanning region corresponding to the crop frame 912 and the region actually scanned by the scan engine 205 with the blank image, thus generating the image corresponding to the size of the crop frame 912.

In S2108, the CPU 201 deletes the preview information on the transmissive original remaining in the memory.

In the case where the determination is made in S2002 or S2011 that the transmissive original is not set on, the CPU 201 proceeds to S2020 and deletes the preview information on the transmissive original remaining in the memory.

In S2021, the CPU 201 executes the scan processing on the reflective original in accordance with the instruction received from the standard driver 503.

In S2022, the CPU 201 performs the image processing suitable for the reflective original on the raw image obtained in S2021. Thereafter, the CPU 201 forwards the generated image to the information processing apparatus 100 in S2023. Hence, the processing is terminated.

According to the above-described embodiment, even in the case where the image processing apparatus is controlled by the standard driver that does not support the scan processing on the transmissive original, it is possible to read the transmissive original appropriately and to provide the user with the appropriate image.

As described above, the image processing apparatus 200 executes the processing described with reference to FIG. 7 in the case where the driver used by the information processing apparatus 100 is the vendor driver 502, and executes the processing described with reference to FIGS. 8 to 23 in the case of the standard driver 503. The above-mentioned switching of the processing is carried out under various conditions. For example, the processing may be switched depending on whether a communication protocol used in the case where the image processing apparatus 200 receives the scanning instruction is the vendor protocol or the standard protocol mentioned above. Alternatively, the scanning instruction may contain information to specify the type of the driver and the processing to be executed by the image processing apparatus 200 may be switched depending on this information.

In the meantime, the vendor driver 502 and the image processing apparatus 200 may perform processing similar to that described in FIGS. 9 to 23 even in the case where the vendor driver 502 instructs the film scanning. Moreover, the vendor driver 502 may execute a function, which is not implemented in the standard driver 503, on the scanned image received from the image processing apparatus 200. Thus, the image processing apparatus 200 does not have to switch the processing depending on the driver used by the information processing apparatus 100.

Meanwhile, depending on the types of the information processing apparatus 100 and the image processing apparatus 200, the information processing apparatus 100 may have a larger processing capacity than the image processing apparatus. In this case, by switching the processing in the image processing apparatus 200 depending on the type of the driver, it is possible to perform the preview of the scanned images and the real scanning on the film at a higher speed in the case of using the vendor driver 502.

Second Embodiment

Figure 24:
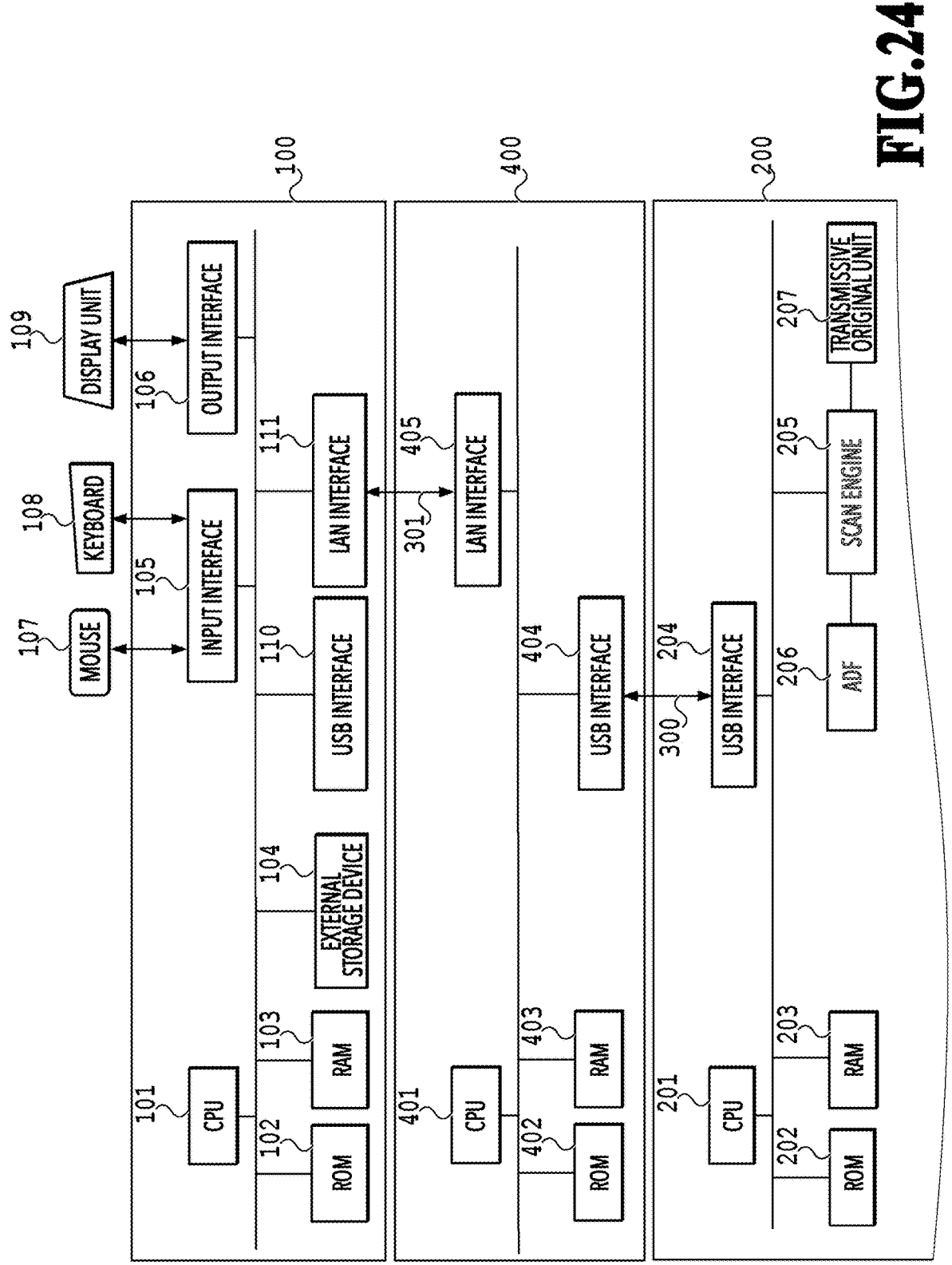
FIG. 24 is a diagram showing an information processing system used in a second embodiment.

FIG. 24 is a diagram showing an information processing system used in this embodiment. The information processing system of this embodiment includes a scanner server 400 in addition to the information processing apparatus 100 and the image processing apparatus 200.

In the scanner server 400, a CPU 401 controls the entire apparatus in accordance with programs stored in a ROM 402 while using a RAM 403 as a work area. The scanner server 400 is connected via a network to a LAN interface 111 of the information processing apparatus 100 through a LAN interface 405. Moreover, the scanner server 400 is connected to a USB interface 204 of the image processing apparatus 200 through a USB interface 404.

Figure 25A:
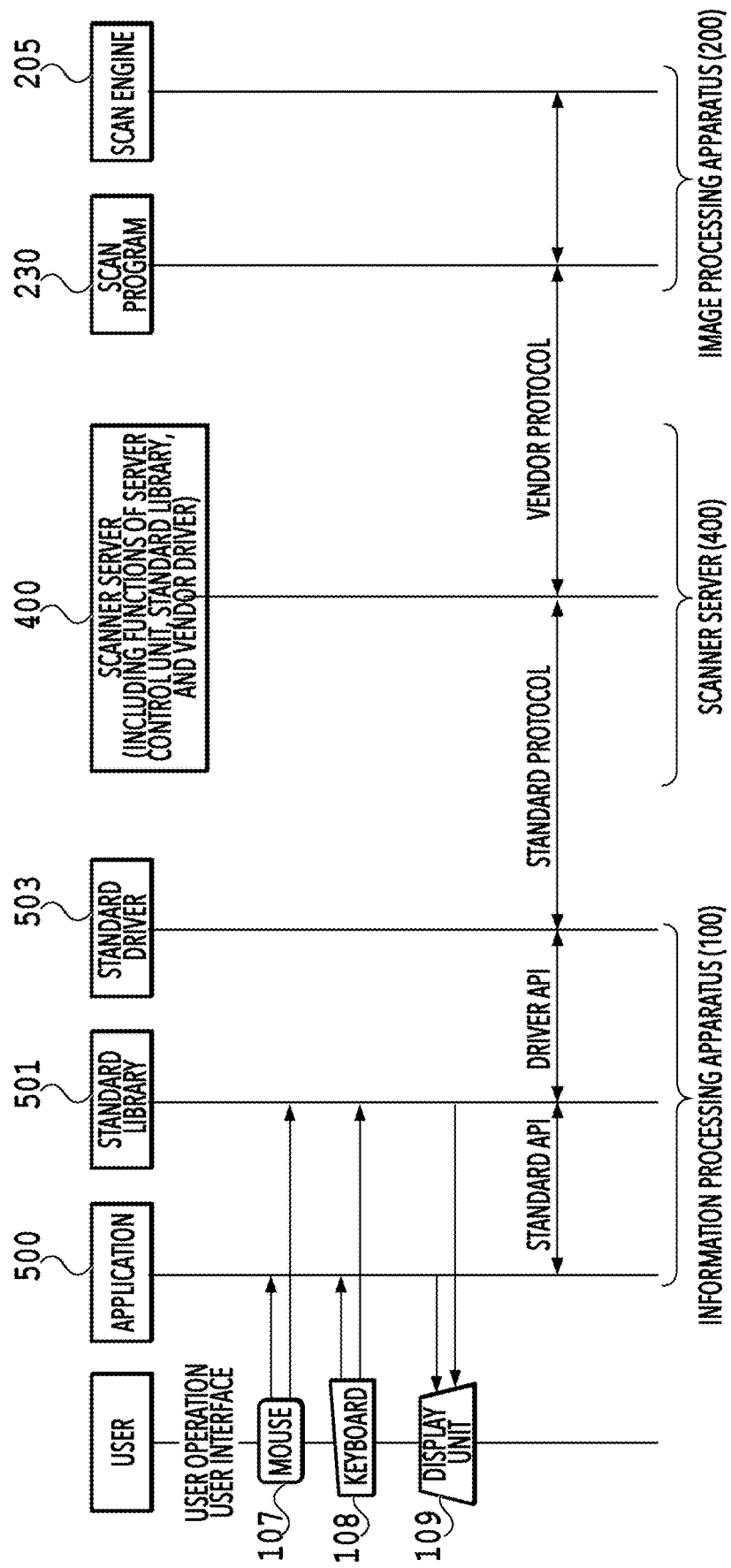
FIGS. 25A and 25B are diagrams showing configurations of control across software components in the information processing system.
Figure 25B:
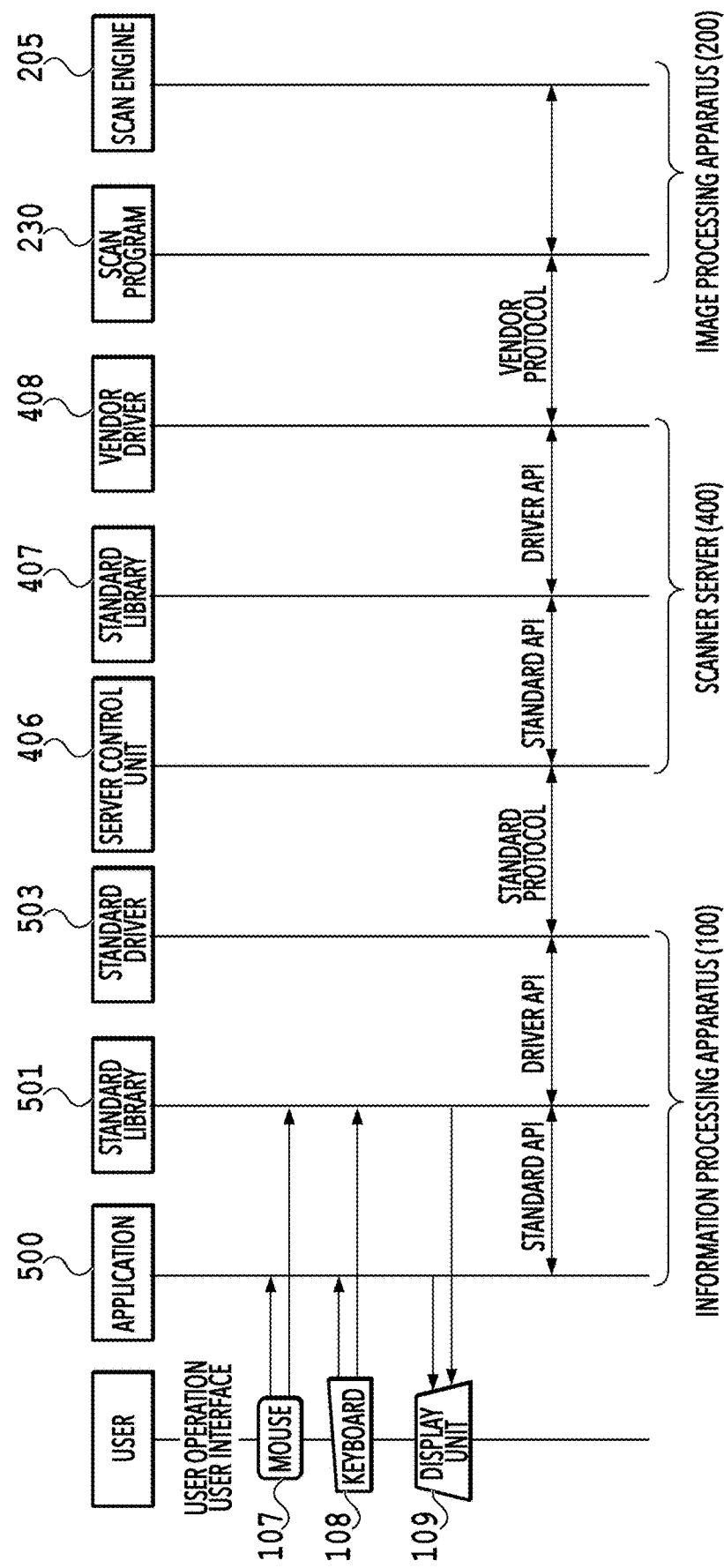

FIGS. 25A and 25B are diagrams showing configurations of control across software components in the information processing apparatus 100, the scanner server 400, and the image processing apparatus 200. FIG. 25A shows a state where a function of the vendor driver is customized and incorporated into the scanner server 400. Meanwhile, FIG. 25B shows a state where the scanner server 400 includes functions of a server control unit 406, a standard library 407, and a vendor driver 408. In each case, the scanner server 400 exchanges information with a standard driver 503 of the information processing apparatus 100 by using the standard protocol and exchanges information with a scan program 230 of the image processing apparatus 200 by using the vendor protocol.

In the case of the above-described information processing system, either the scanner server 400 or the server control unit 406 implements the functions of the scan program 230 described with reference to FIGS. 9, 15, and 16 to 22. Specifically, in this embodiment as well, it is possible to cause the image processing apparatus to appropriately read the reflective original and to provide the user with the appropriate image even in the situation where the image processing apparatus is controlled by the standard driver that does not support the scan processing on the transmissive original.

Note that the information processing apparatus 100 can use the vendor driver 502 in the second embodiment as well. As with the first embodiment, the scanning instruction from the vendor driver 502 is transmitted to the image processing apparatus 200 without the intermediary of the scanner server 400. In this case, the scan processing is executed for the vendor driver 502 as with the first embodiment. The scanning instruction in this case is transmitted by using the above-mentioned vendor protocol.

Other Embodiments

The present invention can also be realized by supplying a program to implement one or more functions of any of the above-described embodiments to a system or to an apparatus through a network or a storage medium, and causing one or more processors in a computer in the system or the apparatus to read the program and to execute processing. In addition, the present invention can also be realized by a circuit (such as an ASIC) that implements the aforementioned one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-216998 filed Nov. 29, 2019, which is hereby incorporated by reference wherein in its entirety.

What is claimed is:

1. A control method for an apparatus for controlling a reading apparatus configured to perform reading in a transmission mode in which an original set on a platen is read by using transmission light emitted from above the platen and transmitted through the original and perform reading in a reflection mode in which the original set on the platen is read by using reflection light emitted from under the platen and reflected by the original, comprising:
    a read controlling step of causing the reading apparatus to read the original set on the platen in the transmission mode based on the reading apparatus being in a predetermined state for reading a film as the original and causing the reading apparatus to read the original set on the platen in the reflection mode based on the reading apparatus not being in the predetermined state, in a case where a reading instruction from operating system standard software is received, wherein the original includes a plurality of frames;
    a generating step of generating a display image based on a read image obtained by the reading in the read controlling step, wherein at least one frame image corresponding to at least one of the plurality of frames is arranged in the display image; and
    a processing step of executing processing for displaying the display image generated in the generating step on a screen displayed by the operating system standard software.

2. The control method according to claim 1, wherein
    in the generating step, the display image in which a plurality of the frame images corresponding to the plurality of frames are arranged is generated based on the read image, a region in the display image generated in the generating step and displayed in the processing step is designated by a user using the operating system standard software, and the control method further comprises a second read controlling step of causing the reading apparatus to read at least one of the plurality of frames based on the region designated by the user and on display positions of the plurality of frame images in the display image, wherein the frame image corresponding to the at least one frame is displayed in the designated region.

3. The control method according to claim 1, wherein
the reading apparatus is configured for performing reading in a reflection mode for reading an original by using reflection light emitted from under the platen and reflected by the original placed on an automatic document feeder, the operating system standard software is configured for designating any of the platen and the automatic document feeder, and in the read controlling step, the reading apparatus is caused to read the film set on the platen in the transmission mode based on an instruction of the reading of the original set on the platen from the operating system standard software and the reading apparatus being in the predetermined state.

4. The control method according to claim 1, further comprising
an image processing step of executing prescribed image processing on the read image based on a condition that the reading in the transmission mode has been executed in the read controlling step.

5. The control method according to claim 4, wherein
in the image processing step, the at least one frame image is extracted from the read image, the at least one frame image is subjected to color correction processing, and the at least one frame image is laid out, as the prescribed image processing, and the display image in which the at least one frame image is laid out in the image processing step is generated in the generating step.

6. The control method according to claim 5, wherein
in the image processing step, the read image is analyzed, and a condition for the color correction processing is set for each frame image.

7. The control method according to claim 4, wherein
in the image processing step, a different type of image processing is executed as the prescribed image processing depending on whether or not the reading instruction from the operating system standard software is a preview reading instruction.

8. The control method according to claim 5, wherein
in a case where the reading instruction from the operating system standard software is a preview reading instruction, each frame image is resized and laid out on a preview image in the image processing step as the prescribed image processing based on the number of the extracted frame images.

9. The control method according to claim 2, further comprising
a storing step of storing coordinate information on each of the plurality of frame images in the display image, wherein
in the second read controlling step, the reading apparatus is caused to read the at least one of the plurality of frames based on the region designated by the user and on the coordinate information stored in the storing step, wherein the frame image corresponding to the at least one frame is displayed in the designated region.

10. The control method according to claim 1, wherein the predetermined state is a state where the film is set in the reading apparatus.

11. The control method according to claim 1, wherein the predetermined state is a state where a member for scanning the original in the reflection mode is not attached to the reading apparatus.

12. The control method according to claim 1, wherein the control method is executed by a processor included in the reading apparatus.

13. The control method according to claim 1, wherein the control method is executed by an apparatus being different from the reading apparatus.

14. The control method according to claim 13, wherein the control method is executed by a first apparatus being different from the reading apparatus,
in the read controlling step, the film is read in the transmission mode based on a reading instruction from a second apparatus provided with the operating system standard software, and
in the processing step, the second apparatus executes processing to display the display image by using the operating system standard software.

15. The control method according to claim 14, wherein the first apparatus communicates with the reading apparatus in accordance with a first protocol, and communicates with the second apparatus in accordance with a second protocol being compatible with the operating system standard software and different from the first protocol.

16. A reading apparatus configured to perform reading in a transmission mode in which an original set on a platen is read by using transmission light emitted from above the platen and transmitted through the original and perform reading in a reflection mode in which the original set on the platen is read by using reflection light emitted from under the platen and reflected by the original, comprising:
at least one processor and a memory storing computer executable instructions which when executed by the processor cause the processor to function as:
a read controlling unit configured to cause the reading apparatus to read the original set on the platen in the transmission mode based on the reading apparatus being in a predetermined state for reading a film as the original and causing the reading apparatus to read the original set on the platen in the reflection mode based on the reading apparatus not being in the predetermined state, in a case where a reading instruction from operating system standard software, wherein the original includes a plurality of frames;
a generating unit configured to generate a display image based on a read image obtained by the reading by the read controlling unit, wherein at least one frame image corresponding to at least one of the plurality of frames is arranged in the display image; and
a processing unit configured to execute processing for displaying the display image generated by the generating unit on a screen displayed by the operating system standard software.

17. A non-transitory computer readable storage medium storing a program for causing a computer to execute a control method for controlling a reading apparatus configured to perform reading in a transmission mode in which an original set on a platen is read by using transmission light emitted from above the platen and transmitted through the original and perform reading in a reflection mode in which the original set on the platen is read by using reflection light emitted from under the platen and reflected by the original, the control method comprising:

a read controlling step of causing the reading apparatus to read the original set on the platen in the transmission mode based on the reading apparatus being in a predetermined state for reading a film as the original and causing the reading apparatus to read the original set on the platen in the reflection mode based on the reading apparatus not being in the predetermined state, in a case where a reading instruction from operating system standard software is received, wherein the at least one film original includes a plurality of frames;

a generating step of generating a display image based on a read image obtained by the reading in the read controlling step, wherein at least one frame image corresponding to at least one of the plurality of frames is arranged in the display image; and a processing step of executing processing for displaying the display image generated in the generating step on a screen displayed by the operating system standard software.

18. The control method according to claim 1, wherein the predetermined state is a state where a member used for setting the film is attached in the reading apparatus.

19. The control method according to claim 1, wherein the reading in the transmission mode is a reading performed by emitting light from a light souse placed on a platen cover provided in the reading apparatus.

20. The control method according to claim 1, wherein the reading in the reflection mode is a reading performed by emitting light from a light souse moving with an optical sensor which can receive the transmission light and the reflection light.

* * * * *